(12) United States Patent
Burns et al.

(10) Patent No.: US 11,478,994 B1
(45) Date of Patent: Oct. 25, 2022

(54) HDPE COVERS FOR WASTEWATER TREATMENT LAGOONS, AND HDPE PATCHES THEREON IN SERVICE FOR FURTHER ATTACHMENTS

(71) Applicants: Kyle W. Burns, Springfield, MO (US); Mark Burns, Springfield, MO (US)

(72) Inventors: Kyle W. Burns, Springfield, MO (US); Mark Burns, Springfield, MO (US)

( * ) Notice: Subject to any disclaimer, the term of this patent is extended or adjusted under 35 U.S.C. 154(b) by 0 days.

(21) Appl. No.: 17/467,814

(22) Filed: Sep. 7, 2021

Related U.S. Application Data

(60) Provisional application No. 63/076,017, filed on Sep. 9, 2020.

(51) Int. Cl.
 *B29C 65/24* (2006.01)
 *B29C 65/78* (2006.01)
 *B29C 65/00* (2006.01)
 *B29C 65/80* (2006.01)

(52) U.S. Cl.
 CPC .......... *B29C 65/7802* (2013.01); *B29C 65/24* (2013.01); *B29C 65/80* (2013.01); *B29C 66/65* (2013.01); *B29C 66/863* (2013.01)

(58) Field of Classification Search
 CPC ..... B29C 65/24; B29C 65/80; B29C 65/7802; B29C 66/863; B29C 66/65
 See application file for complete search history.

(56) References Cited

U.S. PATENT DOCUMENTS

| | | | | |
|---|---|---|---|---|
| 5,061,331 | A | * 10/1991 | Gute | ...................... B26D 7/018 156/251 |
| 2020/0130295 | A1 | * 4/2020 | Schibsbye | ............... B29B 15/08 |

* cited by examiner

*Primary Examiner* — Daniel McNally
(74) *Attorney, Agent, or Firm* — Jonathan A. Bay

(57) ABSTRACT

The invention relates to covers for wastewater treatment lagoons, which are typically covered by expansive stretches of sheet-form, high density polyethylene (HDPE). The invention more particularly relates to improvements in attaching HDPE patches at distributed locations thereon, which patches provide locally increased thickness to the cover in service as seats for attachment of further attachments to the cover, such as for example and without limitation HDPE straps for retention of HDPE grout-filled ballast pipes, and so on.

2 Claims, 37 Drawing Sheets

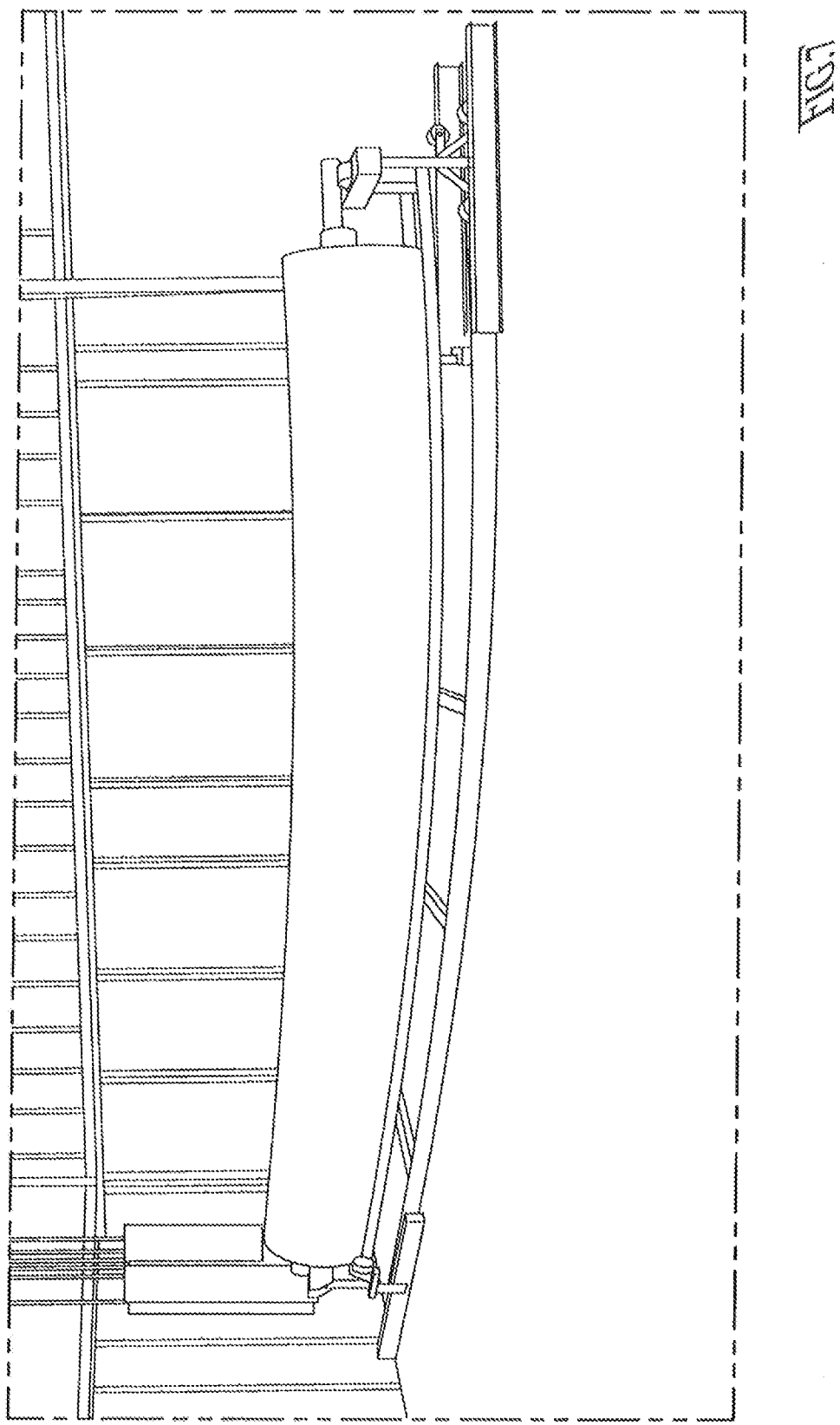

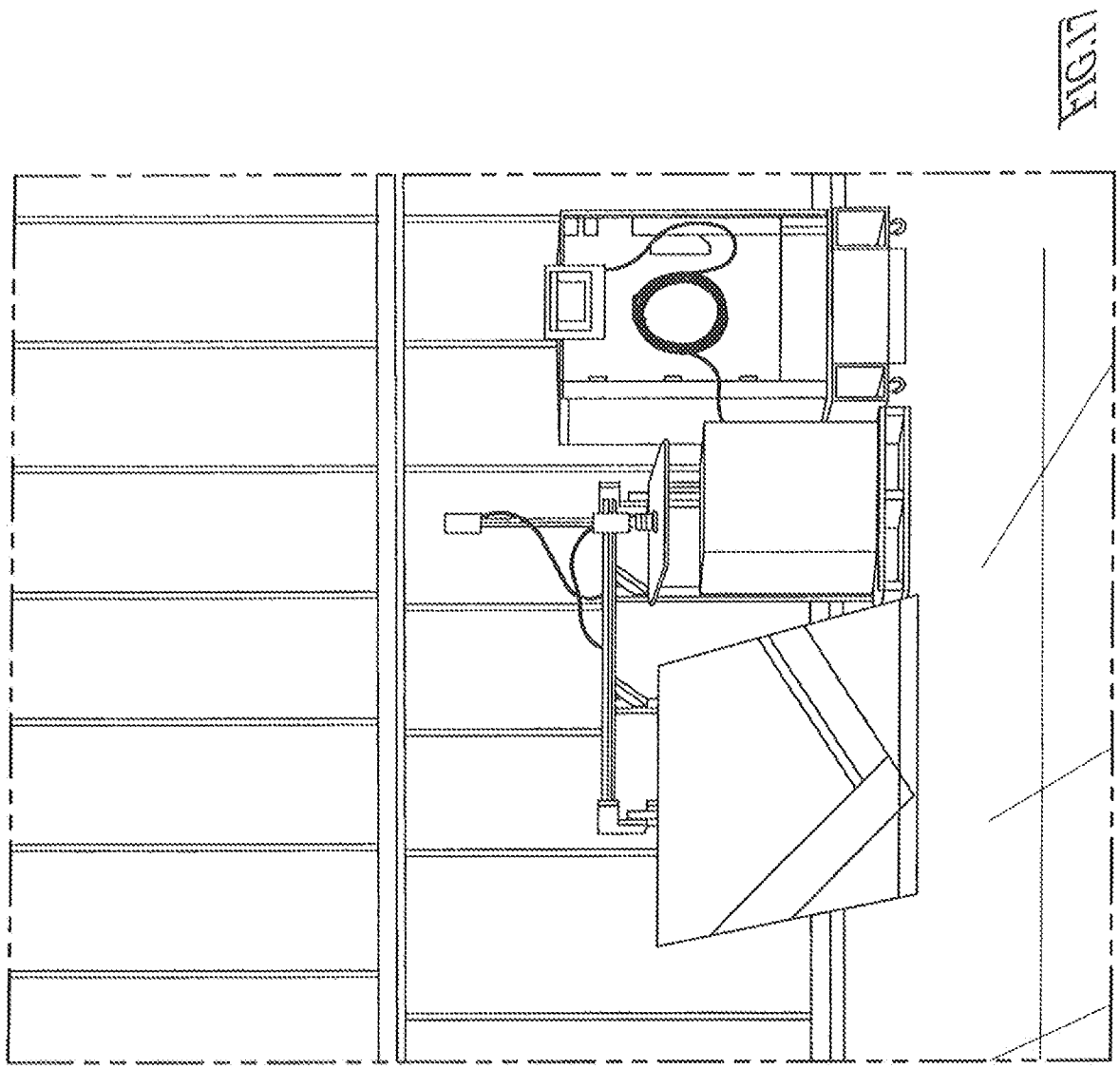

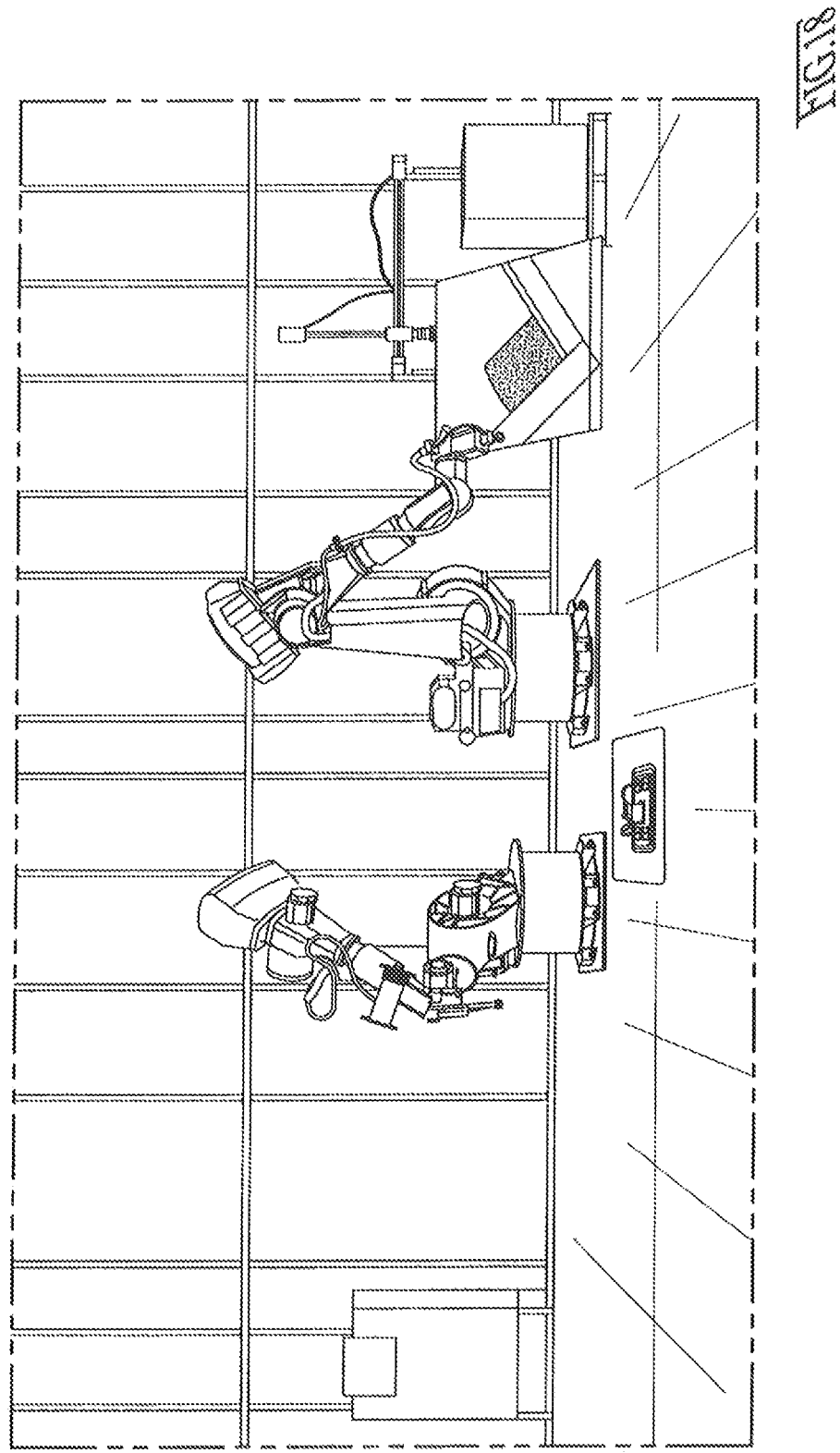

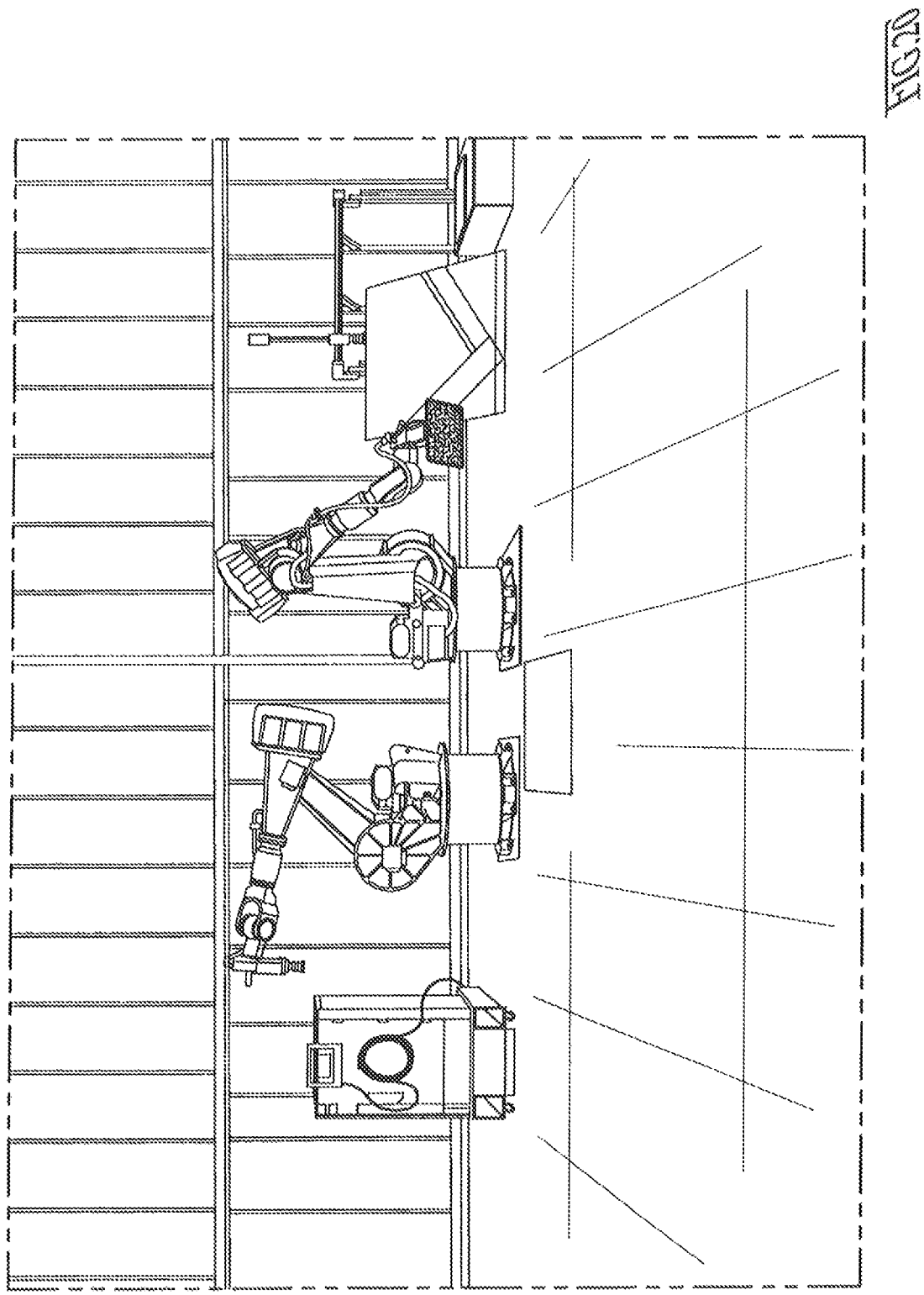

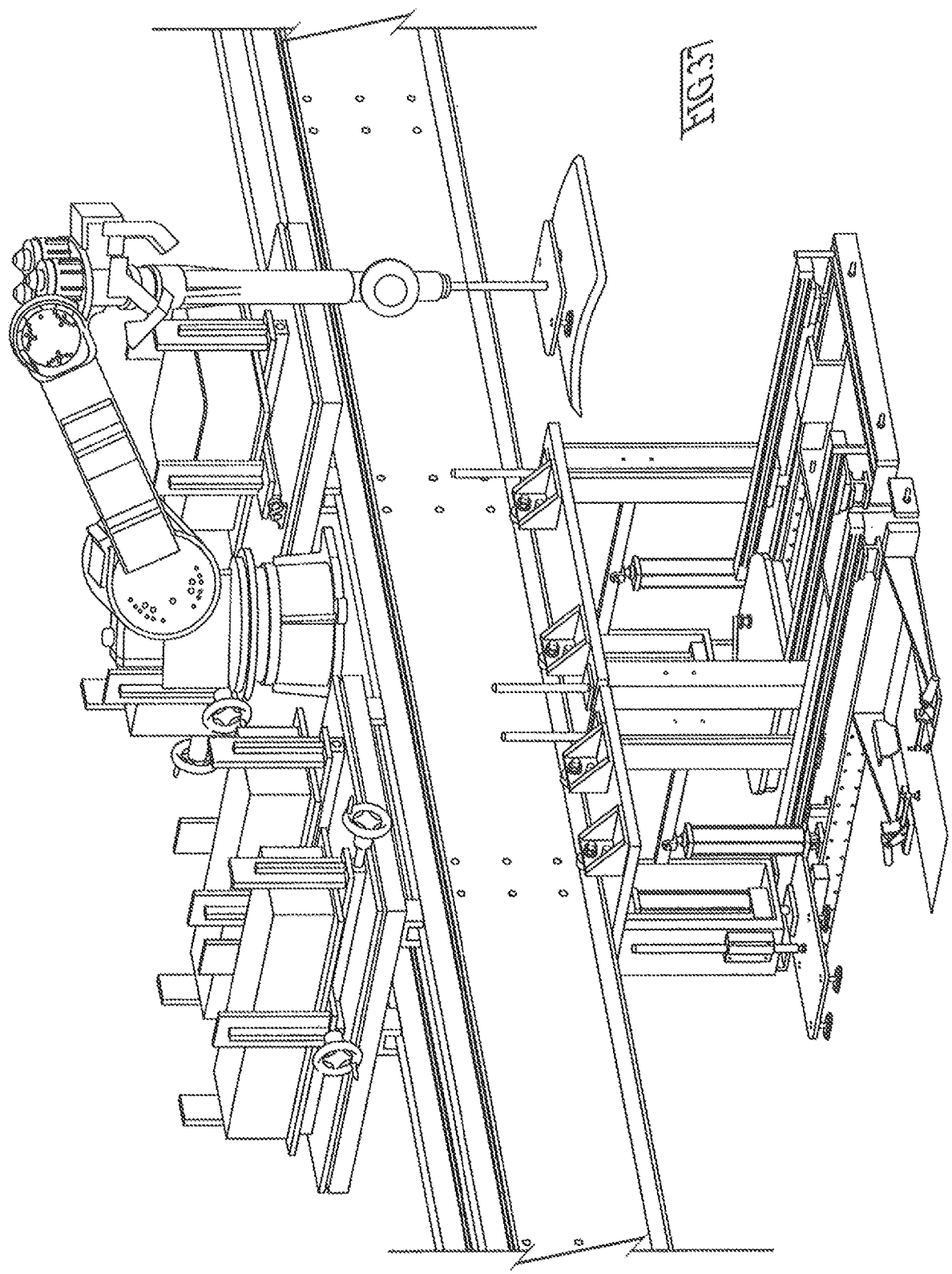

US 11,478,994 B1

HDPE COVERS FOR WASTEWATER TREATMENT LAGOONS, AND HDPE PATCHES THEREON IN SERVICE FOR FURTHER ATTACHMENTS

CROSS-REFERENCE TO PROVISIONAL APPLICATION(S)

This application claims the benefit of U.S. Provisional Application No. 63/076,017, filed Sep. 9, 2020. The foregoing patent disclosure is incorporated herein by this reference thereto.

BACKGROUND AND SUMMARY OF THE INVENTION

The invention relates to covers for wastewater treatment lagoons, which are typically covered by expansive stretches of sheet-form, high density polyethylene (HDPE). The invention more particularly relates to improvements in attaching HDPE patches at distributed locations thereon, which patches provide locally increased thickness to the cover in service as seats for attachment of further attachments to the cover, such as for example and without limitation HDPE straps for retention of HDPE grout-filled ballast pipes, and so on.

A number of additional features and objects will be apparent in connection with the following discussion of the preferred embodiments.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings.

FIG. 6 is a fish-eye lens pictorial view of a remote facility in accordance with the invention for pre-attaching a distributed array of patches on a roll of sheet-form HDPE material. The facility works somewhat on the principle of a 1970's era paper strip chart recorder. Or perhaps on a principle like how the ancients read scrolls of papyrus. There is HDPE cover feed stock in a pay-out roll as shown on the right in the view. The feed stock will be stripped of the pay-out roll and conveyed linearly along the floor of the facility to be taken up to form a wind-up roll on the left side of the view (but the wind-up roll is not shown). As the feed stock passes linearly along the floor underneath the reach of a pair of robot arms, the robot arms will work cooperatively (and automatically as pre-programed in a controller) to attach a multiplicity of patches at the pre-programmed distributed array on the linearly under-passing feed stock. The linearly under-passing feed stock, which now has some of the patches attached to it, will be taken-up by the wind-up roll. Afterwards, the completed wind-up roll is ready for transport to the lagoon work-site for deployment there, with the patches pre-attached in accordance with the preferred distributed array.

The foregoing serves as an overview introduction to the assembly apparatus and methods in accordance with the invention. FIG. 15 though to the end will serve to provide further details.

FIG. 15 shows the two robot arms in the ready, an available patch in the V-shaped "pick" presentation hopper. The feed stock cover material in these succeeding views will be simulated by a 3 foot square (square meter) test sample of the cover material.

FIG. 17 is a close up view of the vacuum-operated suction cup lifting the patch out of the bin.

FIG. 18 shows that the vacuum-operated suction cup has dropped the patch onto the V-shaped "pick" presentation hopper. The drop and the V-shaped "pick" presentation hopper are cooperatively designed so that the patch lands in a desired orientation.

FIG. 19 shows the grapple end of the right robot arm manipulating the metal suction plate/block to "pick" the patch. Note that the meter square cover sample is bare, the one shown in FIGS. 16 and 18 having been removed and replaced by a bare sample.

FIG. 20 shows that the patch has indeed been "picked" by the right robot arm, by and through the metal suction plate/block.

FIG. 24 shows the grapple end of the robot arm doing a 180° rotation (i.e., inversion). The grapple end is going to present an abrading tool in the downward position at the end of this rotation.

FIG. 32 simulates what is preferred to happen. That is, preferably an outstretched span of cover material as shown in FIG. 10, 12 or 14 would be ready for either attachment of a successive patch in a row extending away from the robot arms and into the vantage point of the view, or else, the span would be incrementally conveyed the linear length of distance between rows and a new row of patches would be assembled. In any event, following FIG. 31, where the last patch to be freshly attached is complete, the apparatus and method moves on toward attaching a succeeding patch in the series of the multiplicity of patches. So here in FIG. 32, what is shown instead is a fresh bare meter square sample of cover material. The right robot arm has already "picked" the next patch for "placement," and is in action to place the patch.

The sheet-form HDPE scrolls either left or right, but whichever way, it is preferred to scroll in that one direction only. The scrolling of the sheet-form HDPE establishes a relative X-axis for X-Y mapping of the placement of the patches on the sheet-form HDPE. That is, the gantry is preferably stationary. And thus again, the scrolling of the sheet-form HDPE establishes a relative X-axis for X-Y mapping of the placement of the patches on the sheet-form HDPE, but not by an X-axis travel of the gantry. The out and back trips of the traveling head establishes the relative Y-axis.

Figure 35:
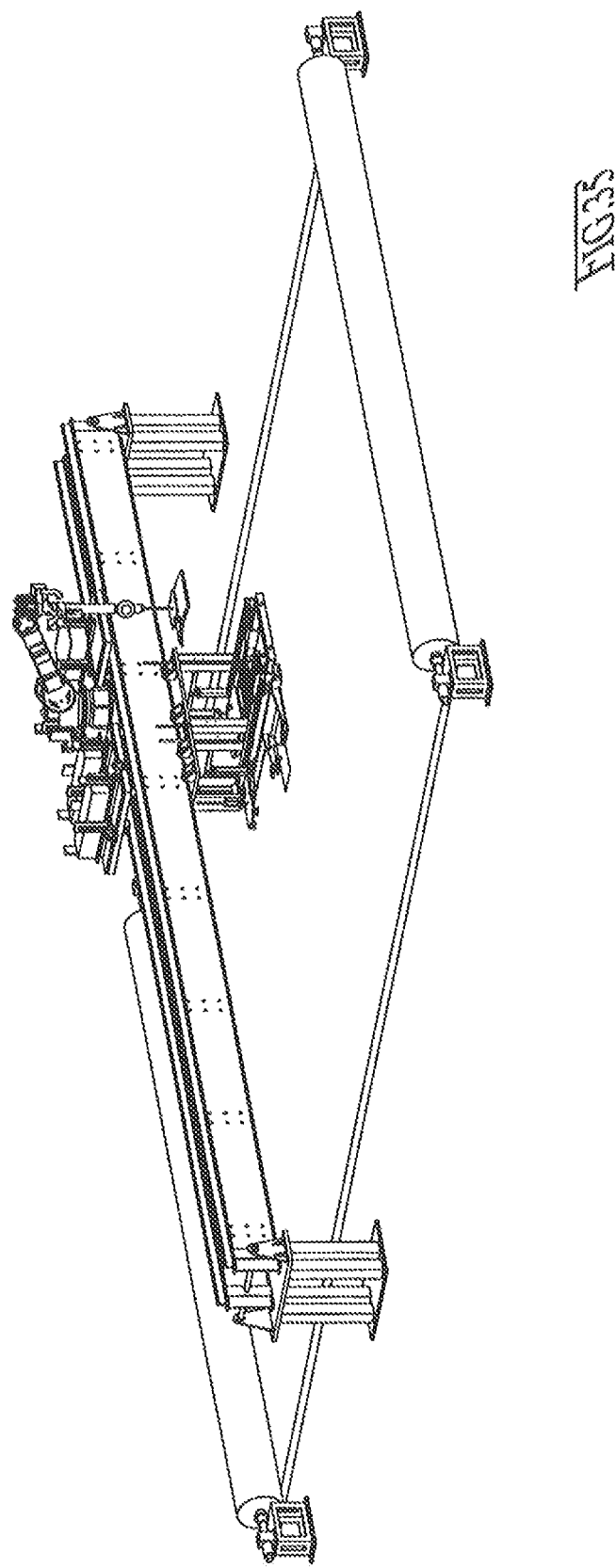
FIG. 35 is a color image of a second embodiment in accordance with the invention for pre-attaching a distributed array of patches on a roll of sheet-form HDPE material. The second embodiment comprises a gantry, a bed of sheet-form HDPE spread out underneath the gantry, and a traveling head that travels out and back on the gantry across and above the spread out sheet-form HDPE.
Figure 36:
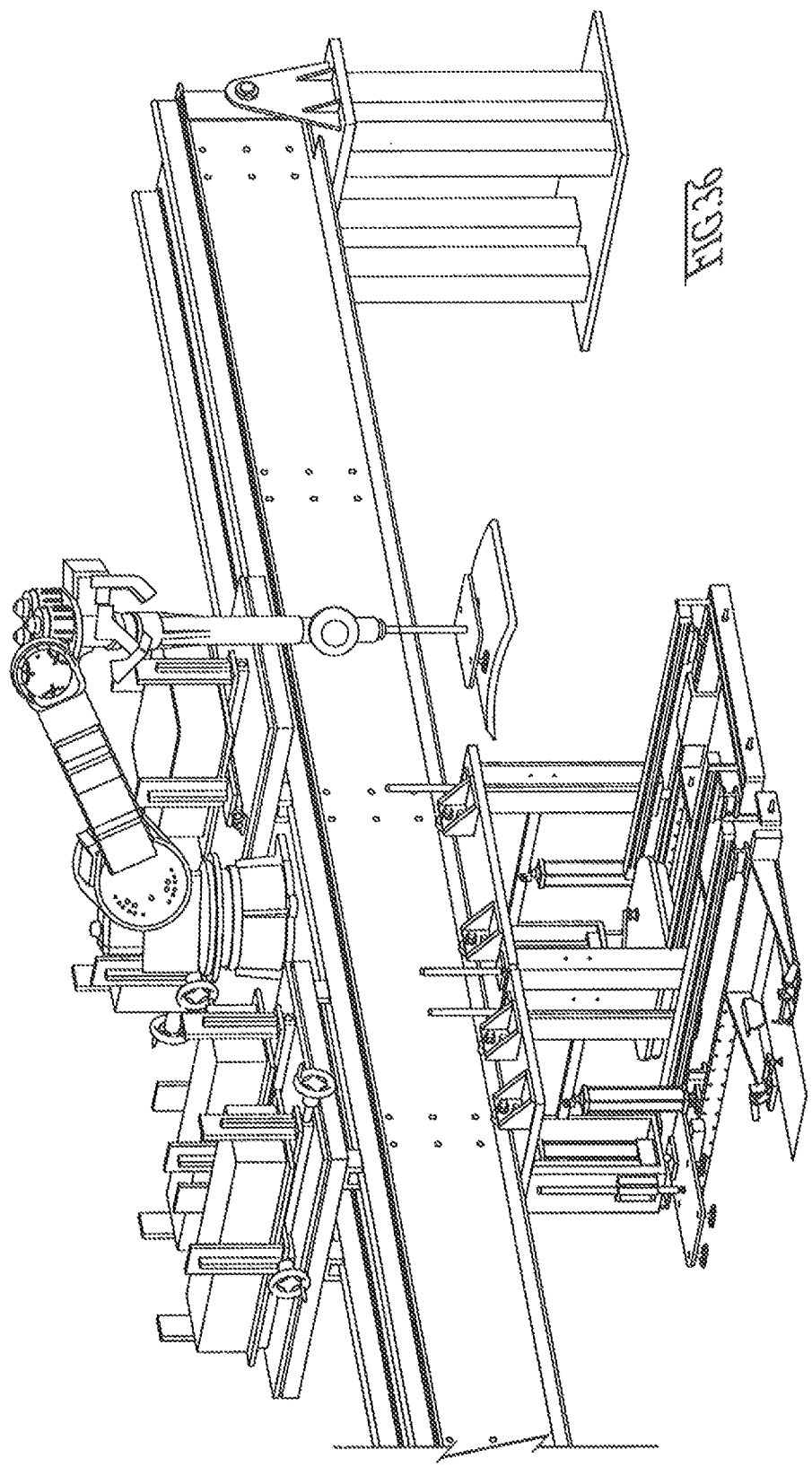

FIG. 36 is a color image comparable to FIG. 35 except on an enlarged scale and showing better the mounting of the traveling head on the tracks provided by the gantry.

FIG. 37 is a color image comparable to FIG. 36 except on an enlarged scale and showing better still the mounting of the traveling head on the tracks provided by the gantry.

The traveling head carries a motor to carry propel itself for its out and back trips, as well as to power a robotic arm which serves many functions including (1) pick, (2) place and (3) weld (or attach). That is, the robotic arm picks a patch from source stack of available packs, which stacks are carried by the traveling head. The robotic arm places the patch in a pre-programmed (or instruction signal sent) placement on the spread out sheet-form HDPE. Then the robotic arm attaches the patch in place by chemical and/or thermal welding.

DETAILED DESCRIPTION OF THE PREFERRED EMBODIMENTS

Figure 1:
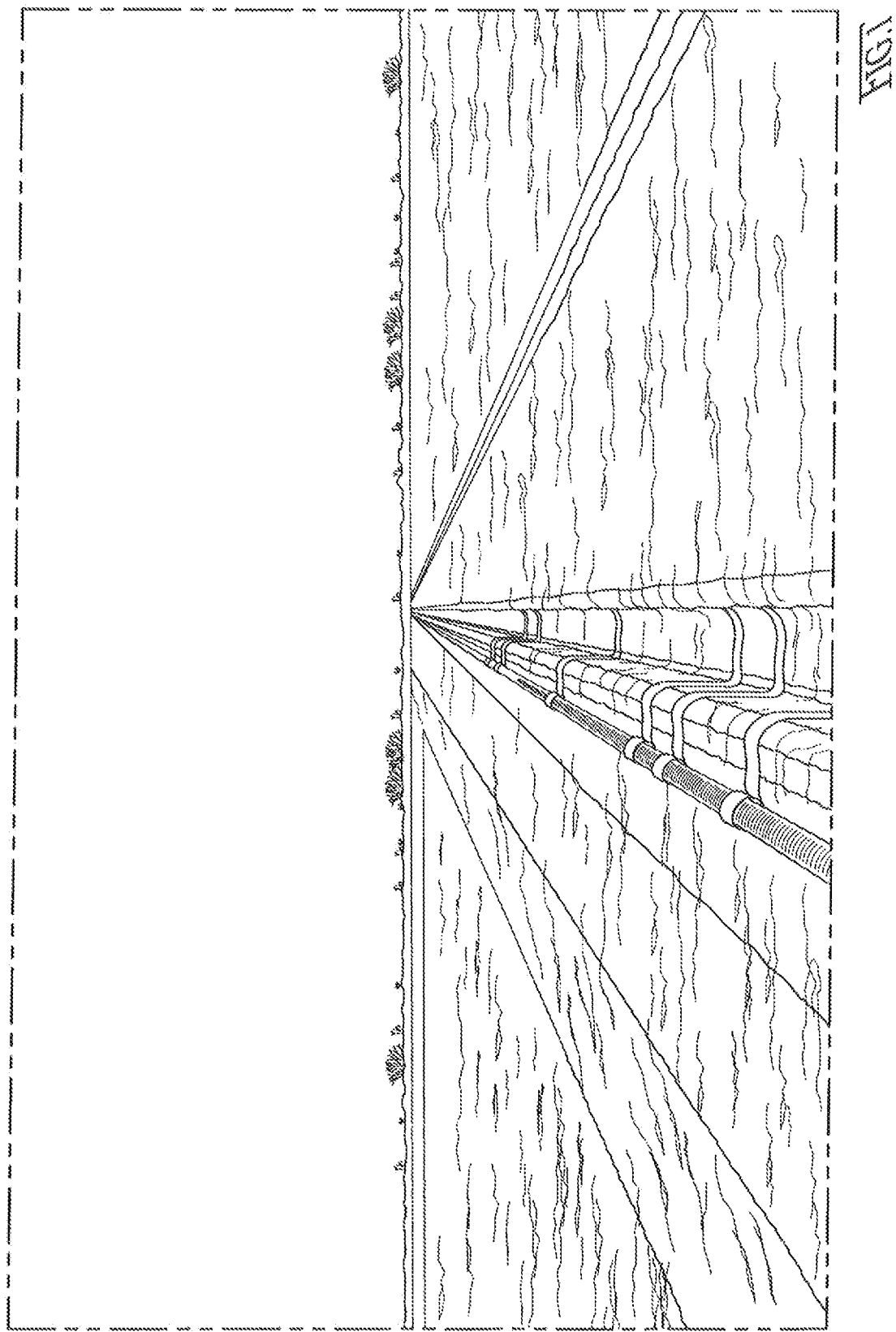
FIG. 1 is a pictorial view showing a wastewater treatment lagoon in the initial phases undergoing construction. The lagoon will typically be a fairly shallow pool, rectangular (or quadrilateral) in plan shape and of fairly uniform depth, which depth will be some portion of a dozen to dozens of feet deep. But the lagoon will have a surface area which might measure in the dozens if not hundreds of acres. It would be typical to also cover the bare earth with an HDPE ground liner, but that's not shown here. The lagoon will be on the left of the berm in the view (to the left of the service road).

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings, FIG. 1 is a pictorial view showing a wastewater treatment lagoon in the initial phases undergoing construction. The lagoon will typically be a fairly shallow pool, rectangular (or quadrilateral) in plan shape and of fairly uniform depth, which depth will be some portion of a dozen to dozens of feet deep. But the lagoon will have a surface area which might measure in the dozens if not hundreds of acres. It would be typical to also cover the bare earth with an HDPE ground liner, but that's not shown here. The lagoon will be on the left of the berm in the view (to the left of the service road).

Figure 2:
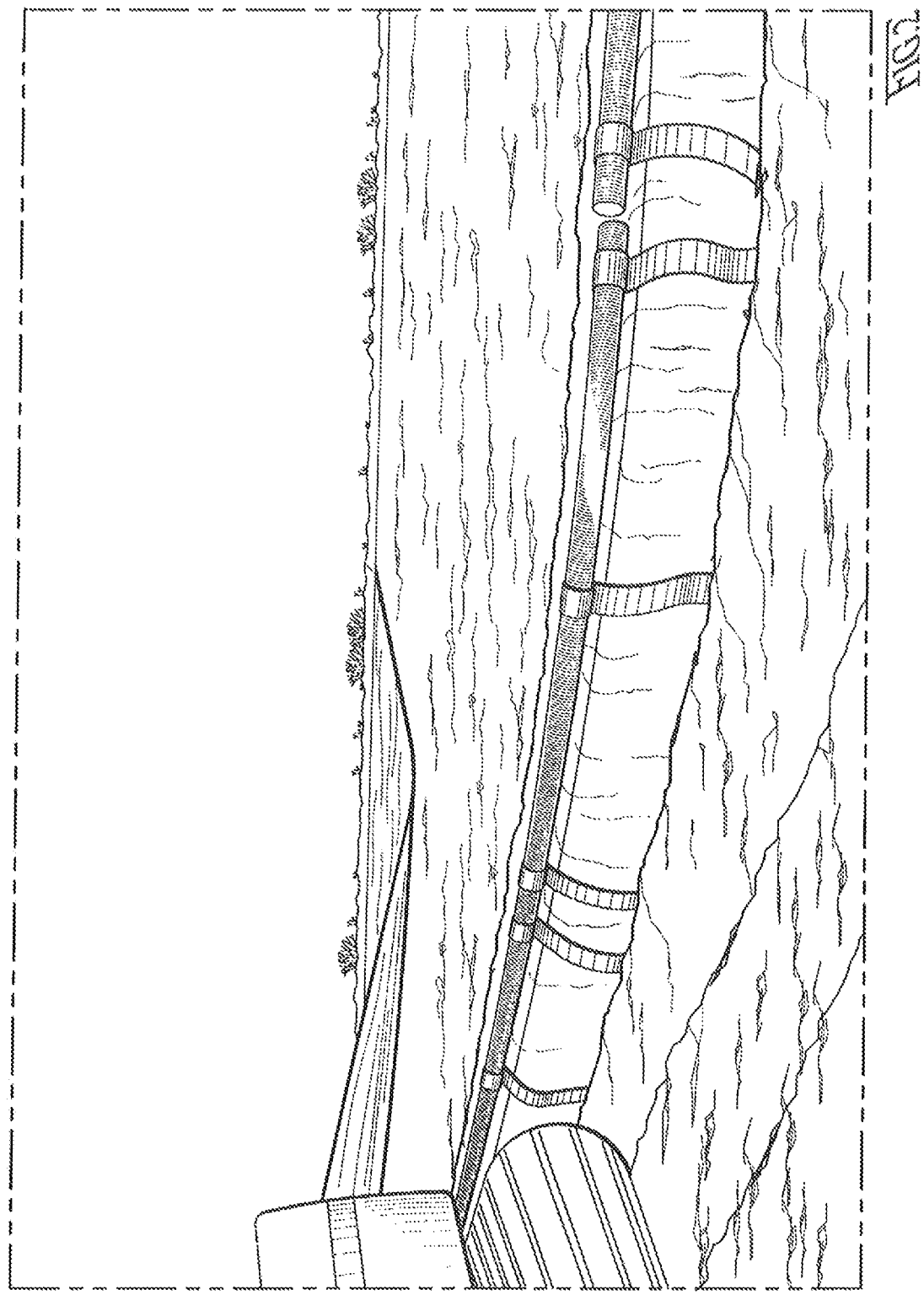
FIG. 2 shows workers assembling the cover. The cover is built by joining elongate sheets of HDPE sheet-form cover material. Each sheet typically arrives to the work-site as a roll. These are big rolls and handled by big machinery. A typical roll might be 23 feet wide, 3 feet in outside diameter, have 150 or more coils to a roll, and weight 4,000 to 5,000 pounds. At some original time, a first roll is uncoiled (e.g., deployed) across the lagoon from one berm to an opposite side berm to form a first sheet. Then a second roll is uncoiled overlapping the first sheet by a slender strip at the respective margins thereto, and the two adjoining sheets are welded together all along their overlap to form a gas-tight seal. This process is repeated dozens to hundreds of times until the cover is a more or less monolithic unit covering the entire plan-form of the lagoon.

FIG. 2 shows workers assembling the cover. The cover is built by joining elongate sheets of HDPE sheet-form cover material. Each sheet typically arrives to the work-site as a roll. These are big rolls and handled by big machinery. A typical roll might be 23 feet wide, 3 feet in outside diameter, have 150 or more coils to a roll, and weight 4,000 to 5,000 pounds. At some original time, a first roll is uncoiled (e.g., deployed) across the lagoon from one berm to an opposite side berm to form a first sheet. Then a second roll is uncoiled overlapping the first sheet by a slender strip at the respective margins thereto, and the two adjoining sheets are welded together all along their overlap to form a gas-tight seal. This process is repeated dozens to hundreds of times until the cover is a more or less monolithic unit covering the entire plan-form of the lagoon.

Figure 3:
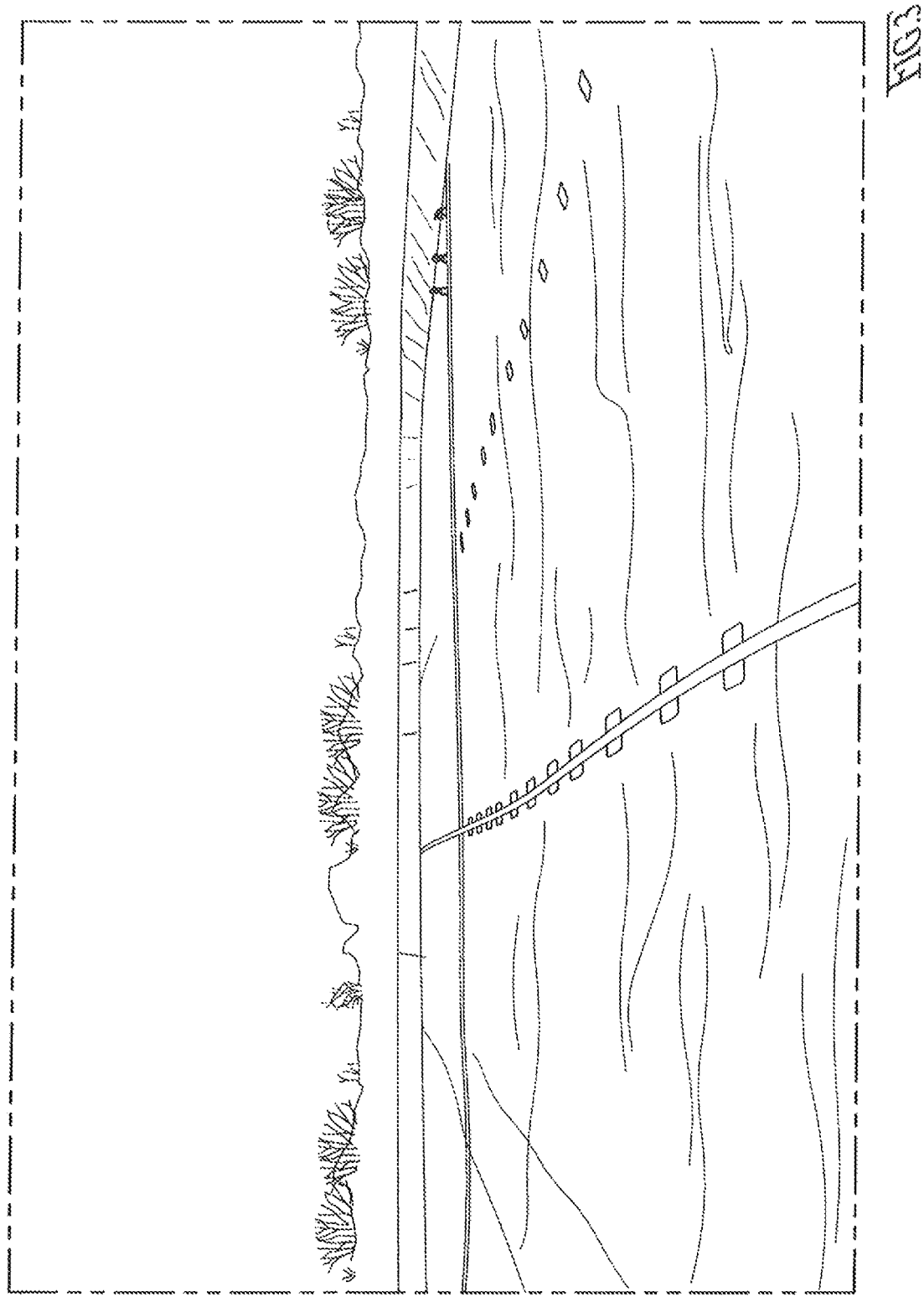
FIG. 3 shows that, after the cover is welded up in a monolithic unit, workers return back across the cover and attach on the top surface of the cover various attachments such as and without limitation a distributed array of straps for holding in place a network of pipes which will be filled with grout (or some flowable heavy material) and thereafter serve as ballast to put a positive pressure on the cover as it floats (is buoyed) on the wastewater and the fermented (created) gases.

FIG. 3 shows that, after the cover is welded up in a monolithic unit, workers return back across the cover and attach on the top surface of the cover various attachments such as and without limitation a distributed array of straps for holding in place a network of pipes which will be filled with grout (or some flowable heavy material) and thereafter serve as ballast to put a positive pressure on the cover as it floats (is buoyed) on the wastewater and the fermented (created) gases.

Figure 4:
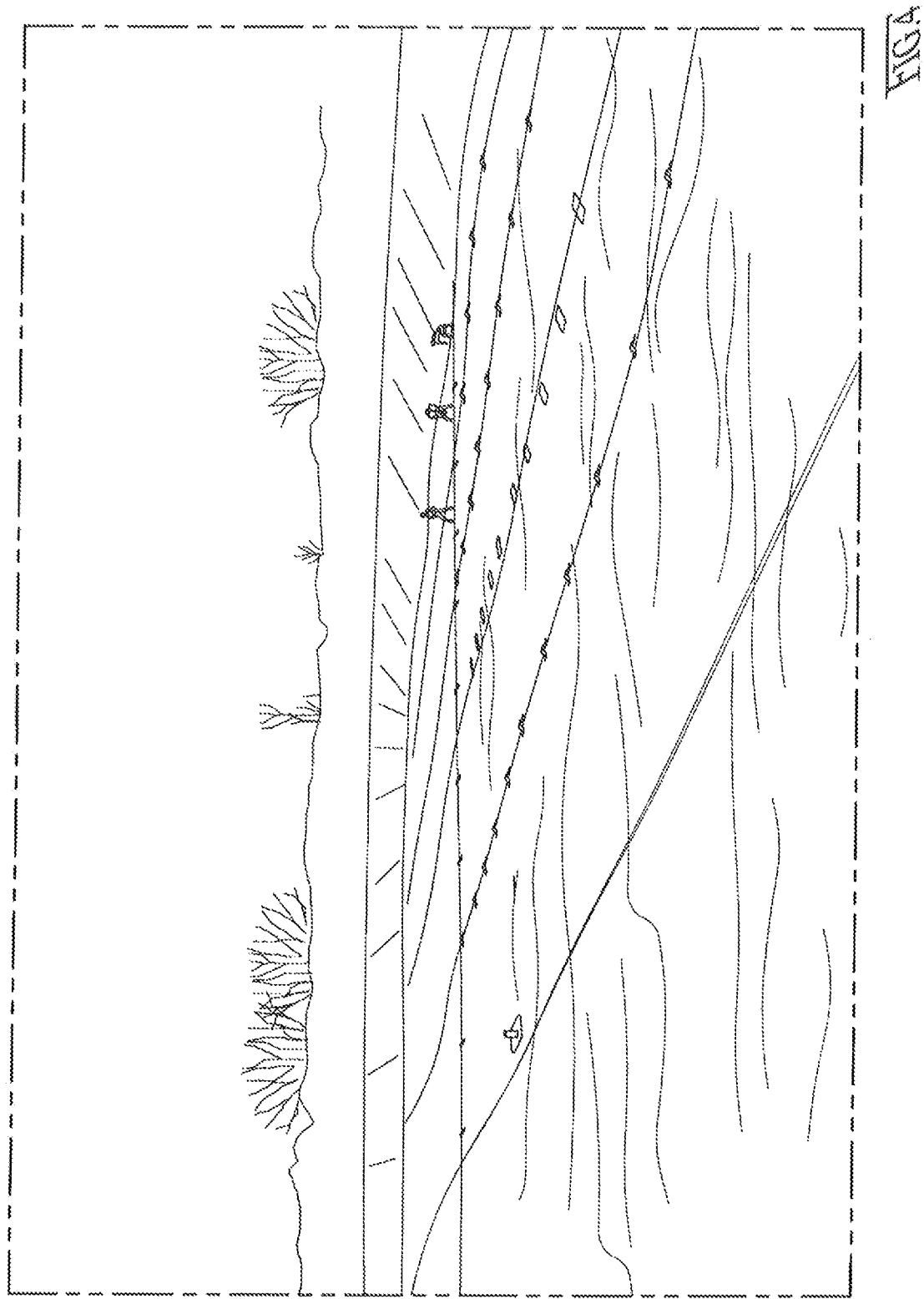
FIG. 4 is a close in view comparable to FIG. 3 except showing better an example of a distributed array of the straps.

FIG. 4 is a close in view comparable to FIG. 3 except showing better an example of a distributed array of the straps.

Figure 5:
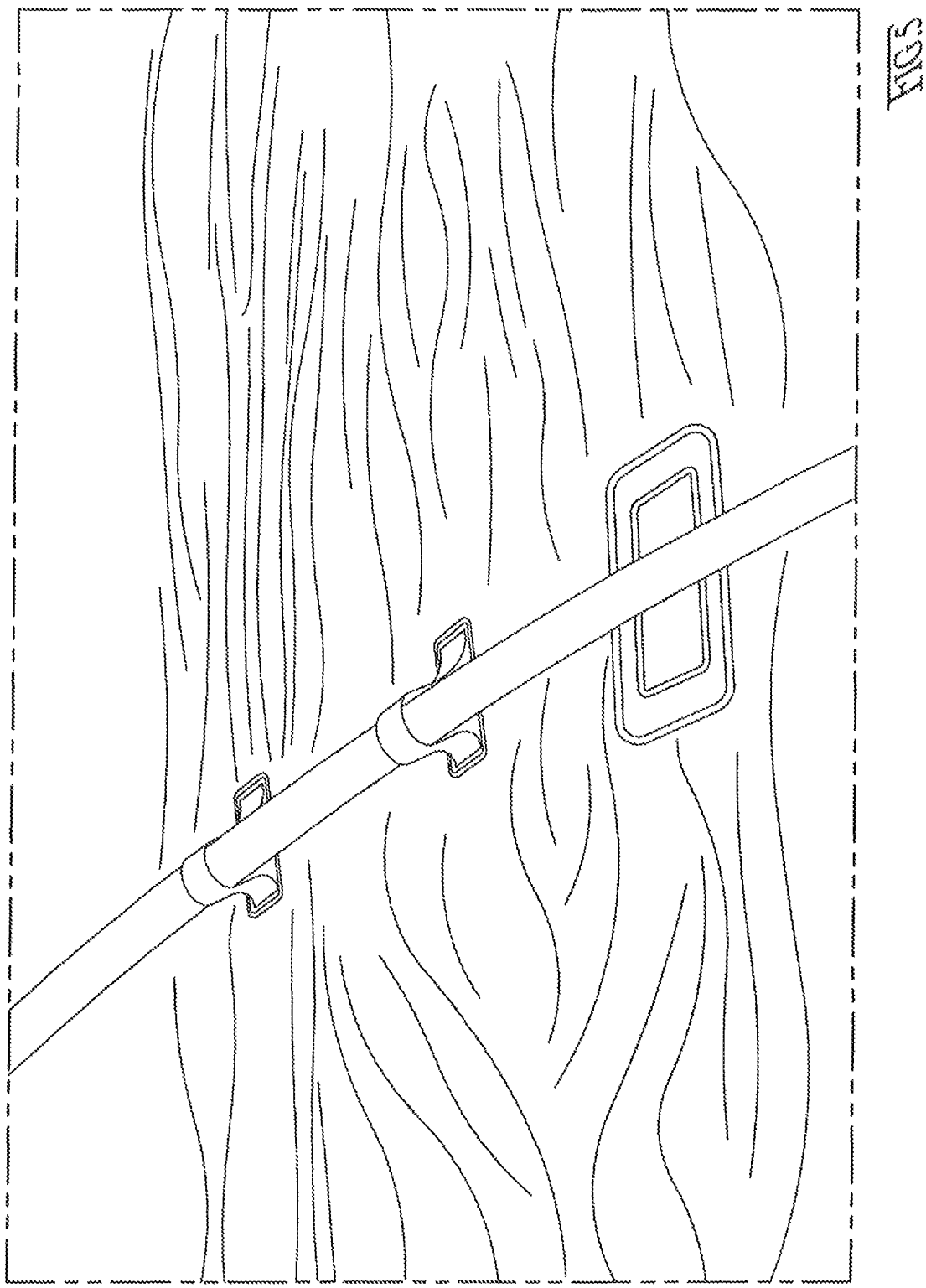
FIG. 5 is a close in view comparable to FIG. 4 except showing better on such strap. It is an aspect of the improvements in accordance with the invention that each strap is attached, not directly to the cover sheet, but an intermediary patch. The patch provides locally increased thickness to the cover. The patch thereby serves as a seat for attachment of various further attachments to the cover, such as for example and without limitation the HDPE straps for retention of HDPE grout-filled ballast pipes, or whatever.

FIG. 5 is a close in view comparable to FIG. 4 except showing better on such strap. It is an aspect of the improvements in accordance with the invention that each strap is attached, not directly to the cover sheet, but an intermediary patch. The patch provides locally increased thickness to the cover. The patch thereby serves as a seat for attachment of various further attachments to the cover, such as for example and without limitation the HDPE straps for retention of HDPE grout-filled ballast pipes, or whatever.

FIG. 6 is a fish-eye lens pictorial view of a remote facility in accordance with the invention for pre-attaching a distributed array of patches on a roll of sheet-form HDPE material. The facility works somewhat on the principle of a 1970's era paper strip chart recorder. Or perhaps on a principle like how the ancients read scrolls of papyrus. There is HDPE cover feed stock in a pay-out roll as shown on the right in the view. The feed stock will be stripped of the pay-out roll and conveyed linearly along the floor of the facility to be taken up to form a wind-up roll on the left side of the view (but the wind-up roll is not shown). As the feed stock passes linearly along the floor underneath the reach of a pair of robot arms, the robot arms will work cooperatively (and automatically as pre-programed in a controller) to attach a multiplicity of patches at the pre-programmed distributed array on the linearly under-passing feed stock. The linearly under-passing feed stock, which now has some of the patches attached to it, will be taken-up by the wind-up roll. Afterwards, the completed wind-up roll is ready for transport to the lagoon work-site for deployment there, with the patches pre-attached in accordance with the preferred distributed array.

Figure 7A:
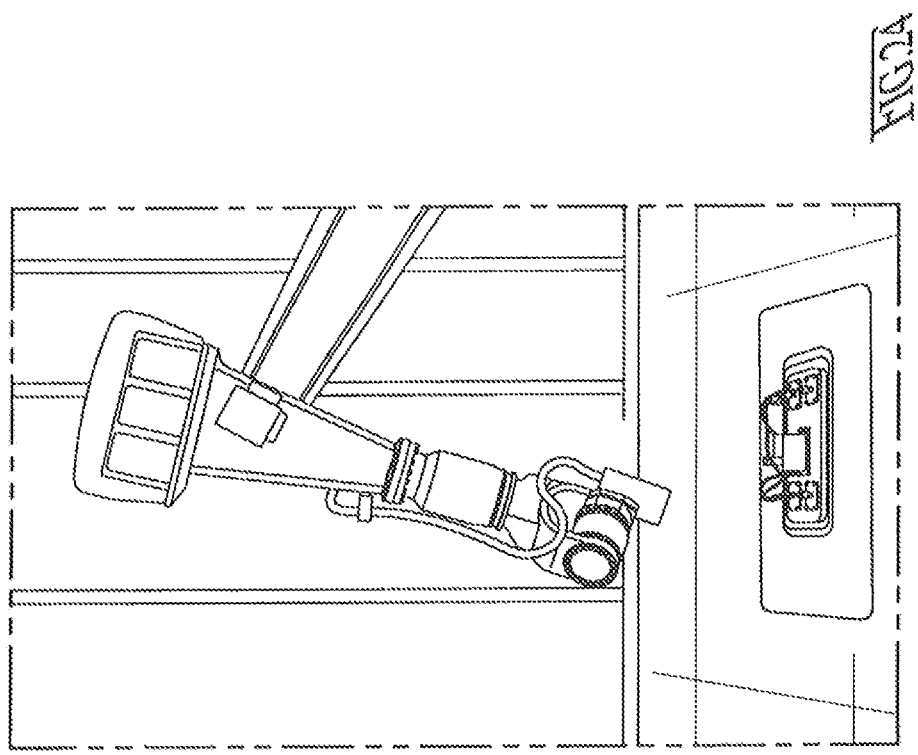
FIG. 7 is an enlarged scale pictorial view of the pay-out roll of HDPE cover feed stock.

FIG. 7 is an enlarged scale pictorial view of the pay-out roll of HDPE cover feed stock.

Figure 8:
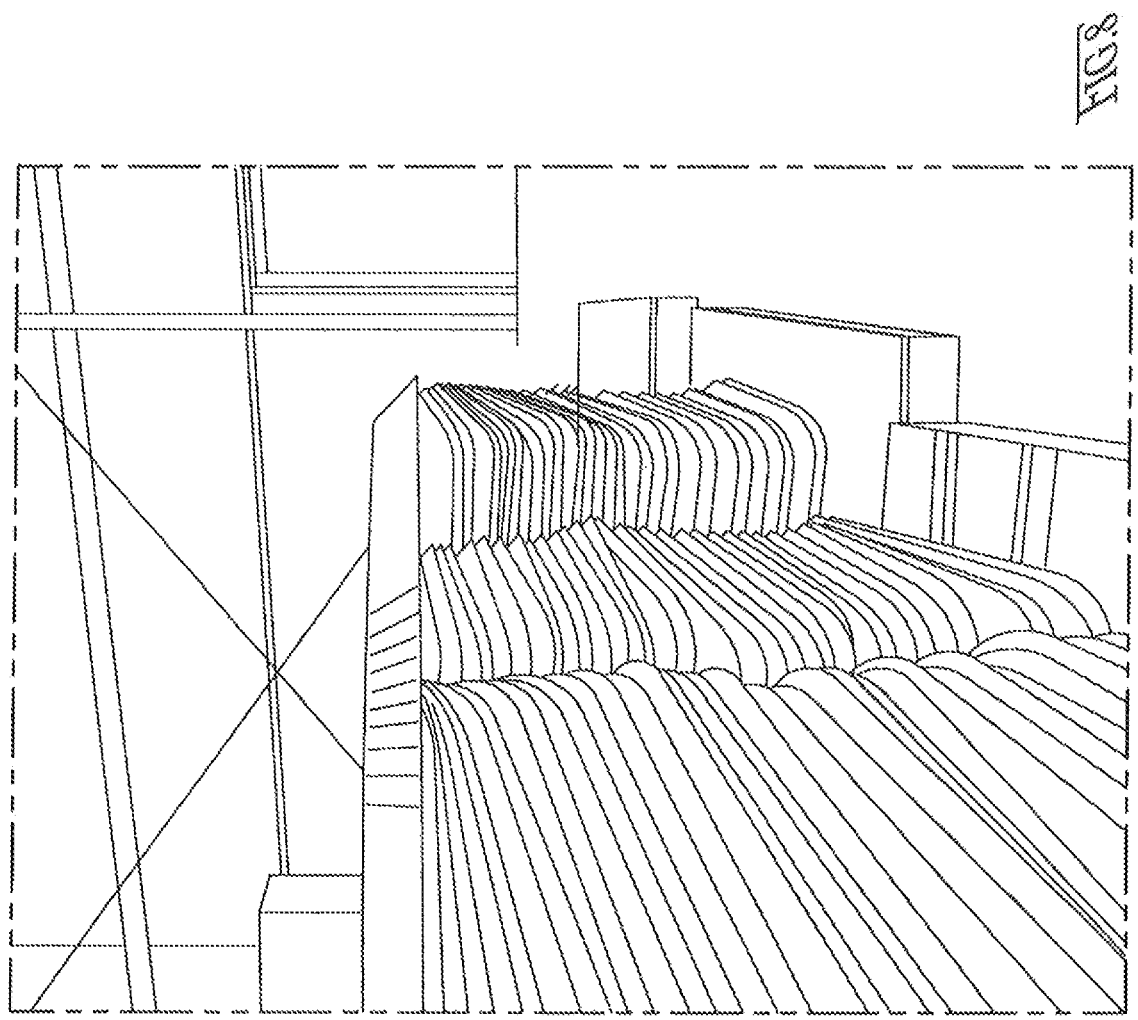
FIG. 8 shows a stock-pile of HDPE patches. These patches are actually thicker than needed for strap anchoring purposes. In fact, these patches are preferred for through line fittings such as plumbing fittings or the like. The patches preferred for anchoring straps are thinner, and, are henceforth flexible enough to wind-up in the wind-up roll after being attached to the cover feed stock.
Figure 9:
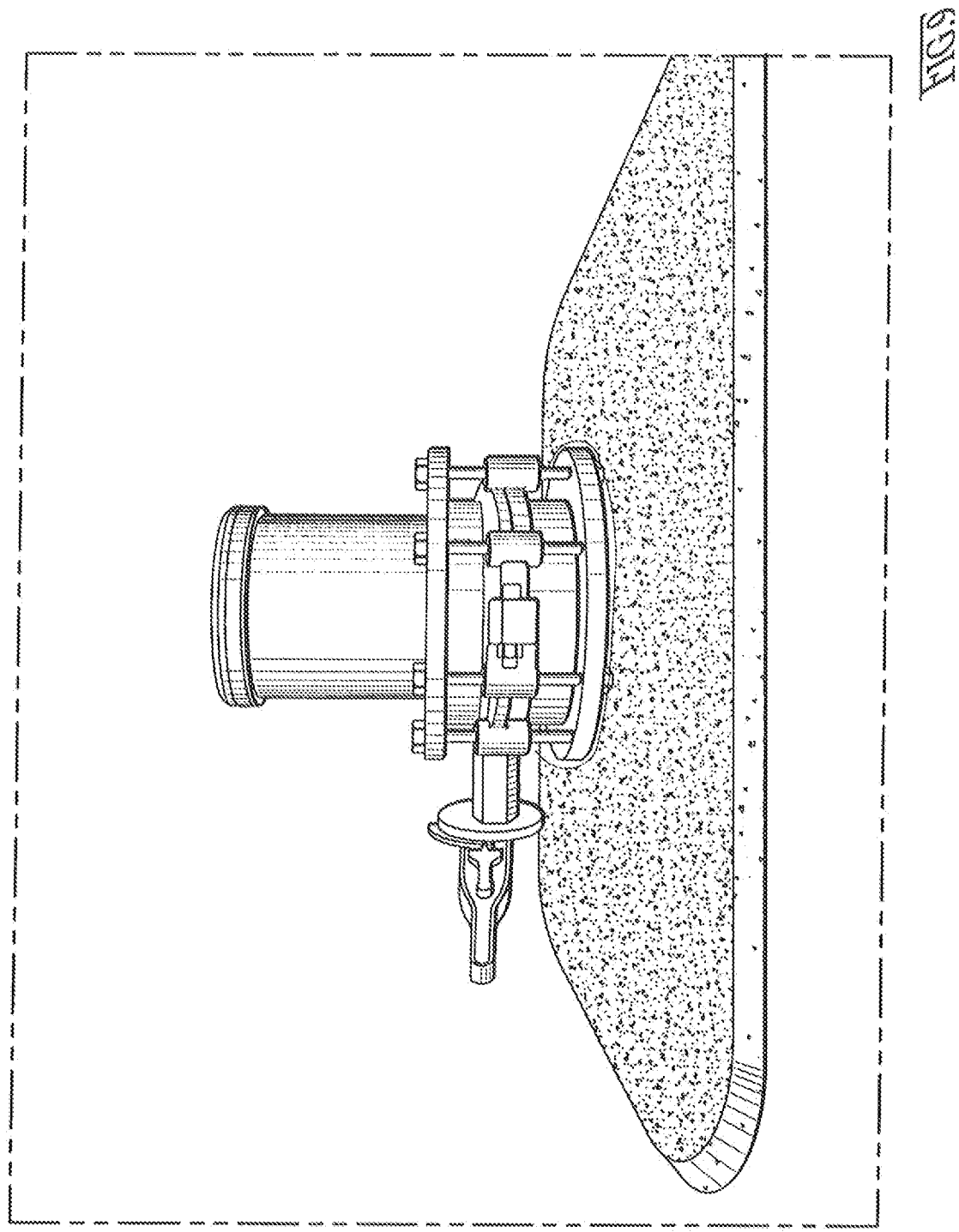

FIG. 8 shows a stock-pile of HDPE patches. These patches are actually thicker than needed for strap anchoring purposes. In fact, these patches are preferred for through line fittings such as plumbing fittings or the like. The patches preferred for anchoring straps are thinner, and, are henceforth flexible enough to wind-up in the wind-up roll after being attached to the cover feed stock.

Figure 9:
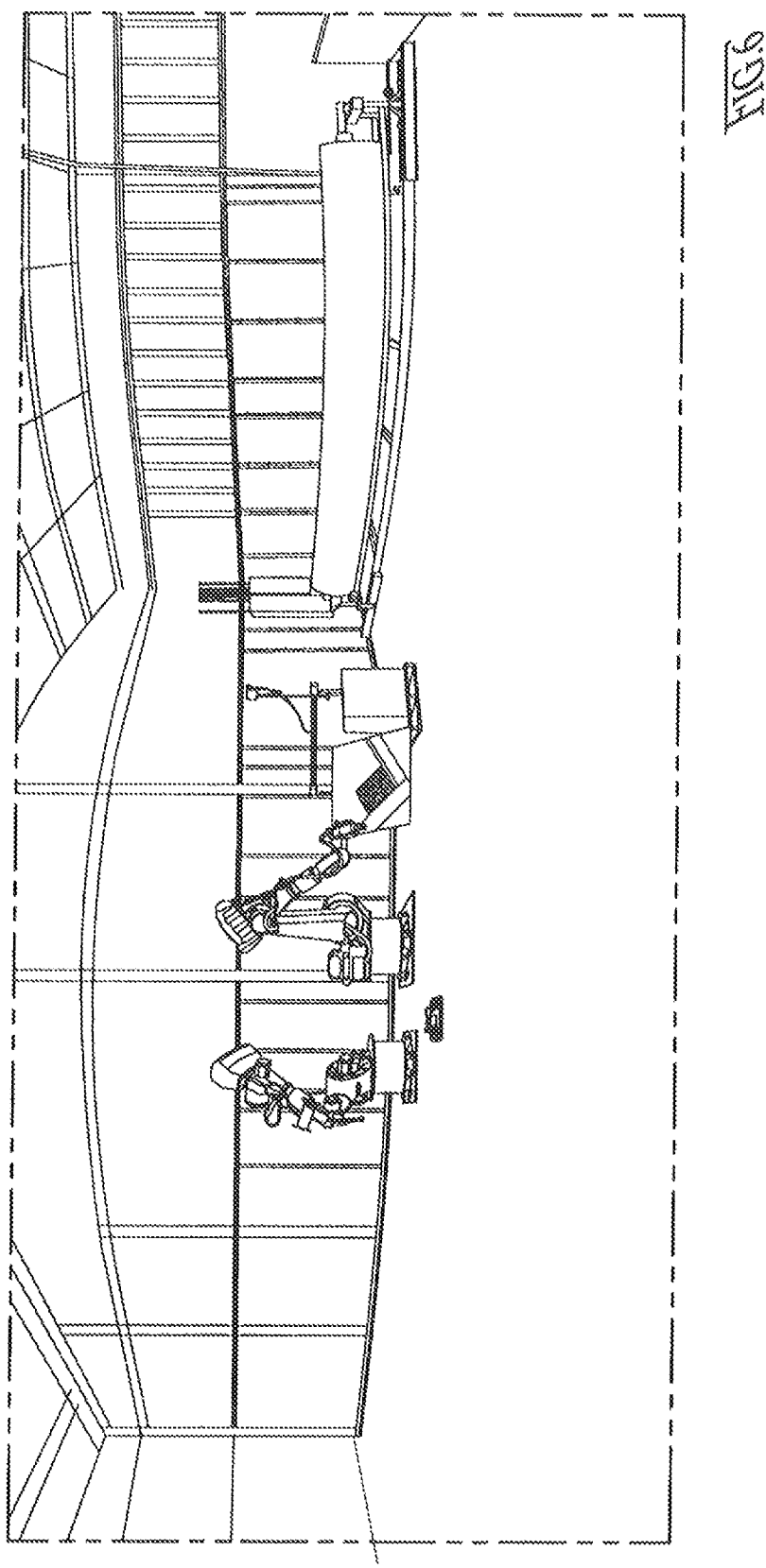
FIG. 9 shows one such patch in FIG. 8 with a plumbing fitting attached to the patch. Again, this patch simulates the patches preferred for anchoring straps, except the strap-anchoring patches are thinner.

FIG. 9 shows one such patch in FIG. 8 with a plumbing fitting attached to the patch. Again, this patch simulates the patches preferred for anchoring straps, except the strap-anchoring patches are thinner.

Figure 10:
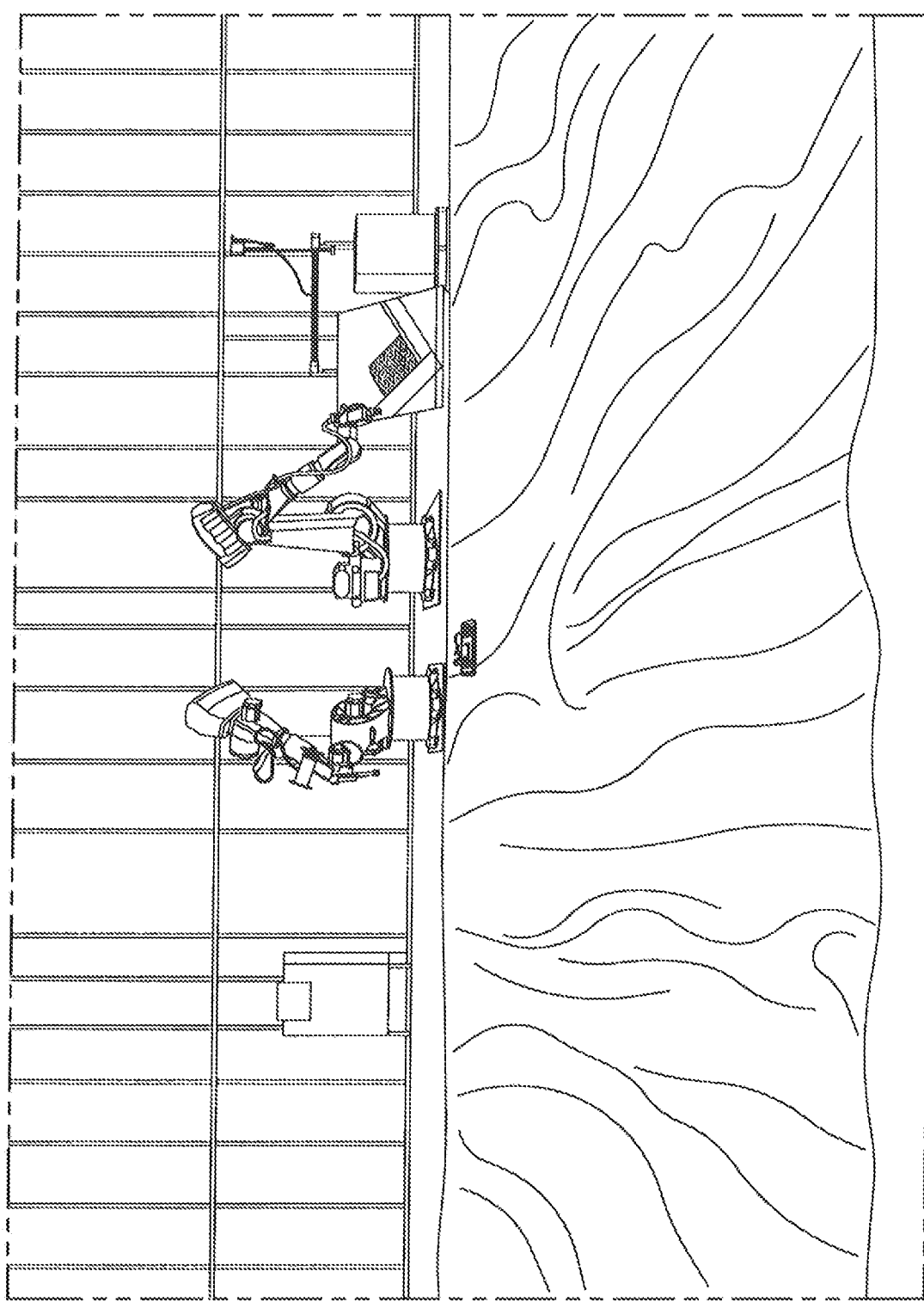
FIG. 10 shows the cover feed stock linearly passing by the pair of robot arms (and linearly passing underneath the reach of the robot arms). One patch is already attached on the outstretched feed stock at a position in between the two robot arms.

FIG. 10 shows the cover feed stock linearly passing by the pair of robot arms (and linearly passing underneath the reach of the robot arms). One patch is already attached on the outstretched feed stock at a position in between the two robot arms.

Figure 11:
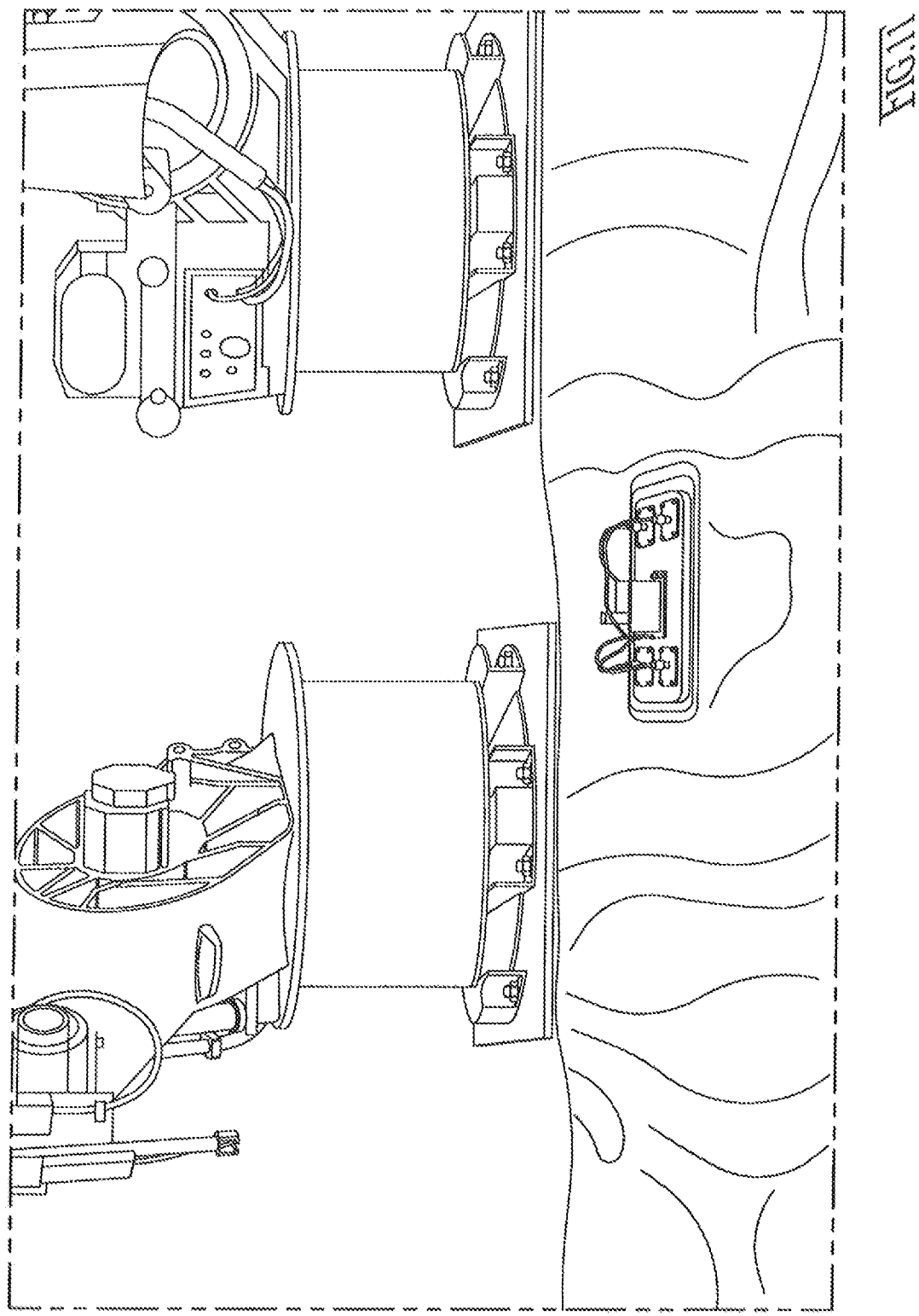
FIG. 11 is a close up view of the patch in isolation. The metal suction plate/block sitting on top the patch is part of the tooling of this assembly line and method. The metal suction plate/block is manipulable by the robot arm on the right. The metal suction plate/block has vacuum lines to suction up and "pick" up a patch from the stockpile as shown in FIG. 8. The robot arm, needless to say, has vacuum service for the metal suction plate/block. The robot arm then "places" the picked patch onto the cover feedstock in the location as shown here in FIG. 11. The robot arm then bleeds the vacuum and releases the metal suction plate/block. Thereafter, the metal suction plate/block serves as a weight to pressure the patch into place on the outstretched cover during the remainder of the attachment operations.

FIG. 11 is a close up view of the patch in isolation. The metal suction plate/block sitting on top the patch is part of the tooling of this assembly line and method. The metal suction plate/block is manipulable by the robot arm on the right. The metal suction plate/block has vacuum lines to suction up and "pick" up a patch from the stockpile as shown in FIG. 8. The robot arm, needless to say, has vacuum service for the metal suction plate/block. The robot arm then "places" the picked patch onto the cover feedstock in the location as shown here in FIG. 11. The robot arm then bleeds the vacuum and releases the metal suction plate/block. Thereafter, the metal suction plate/block serves as a weight to pressure the patch into place on the outstretched cover during the remainder of the attachment operations.

Figure 12:
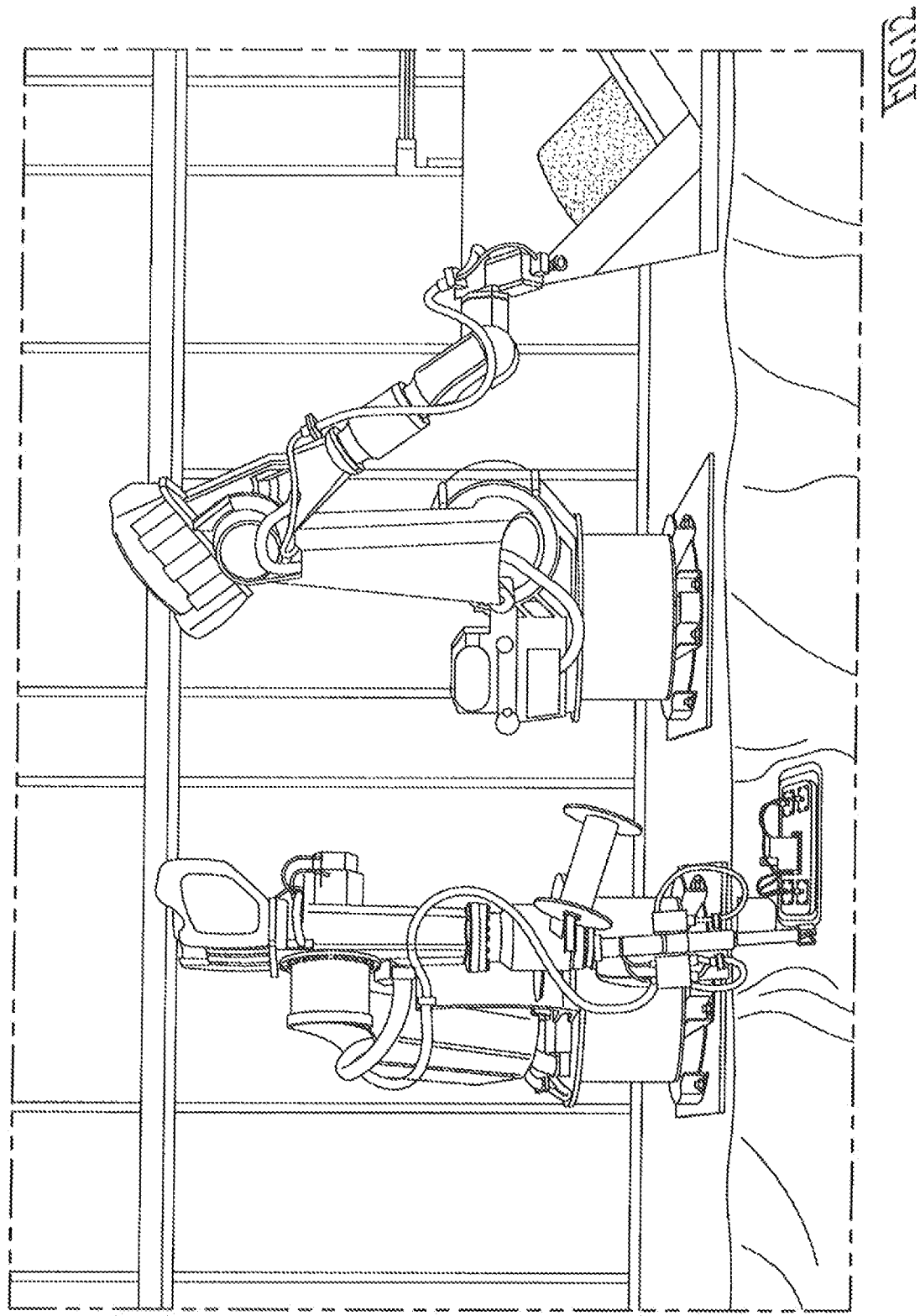
FIG. 12 shows the left robot arm in the middle of a welding operation, welding the patch to the cover.

FIG. 12 shows the left robot arm in the middle of a welding operation, welding the patch to the cover.

Figure 13:
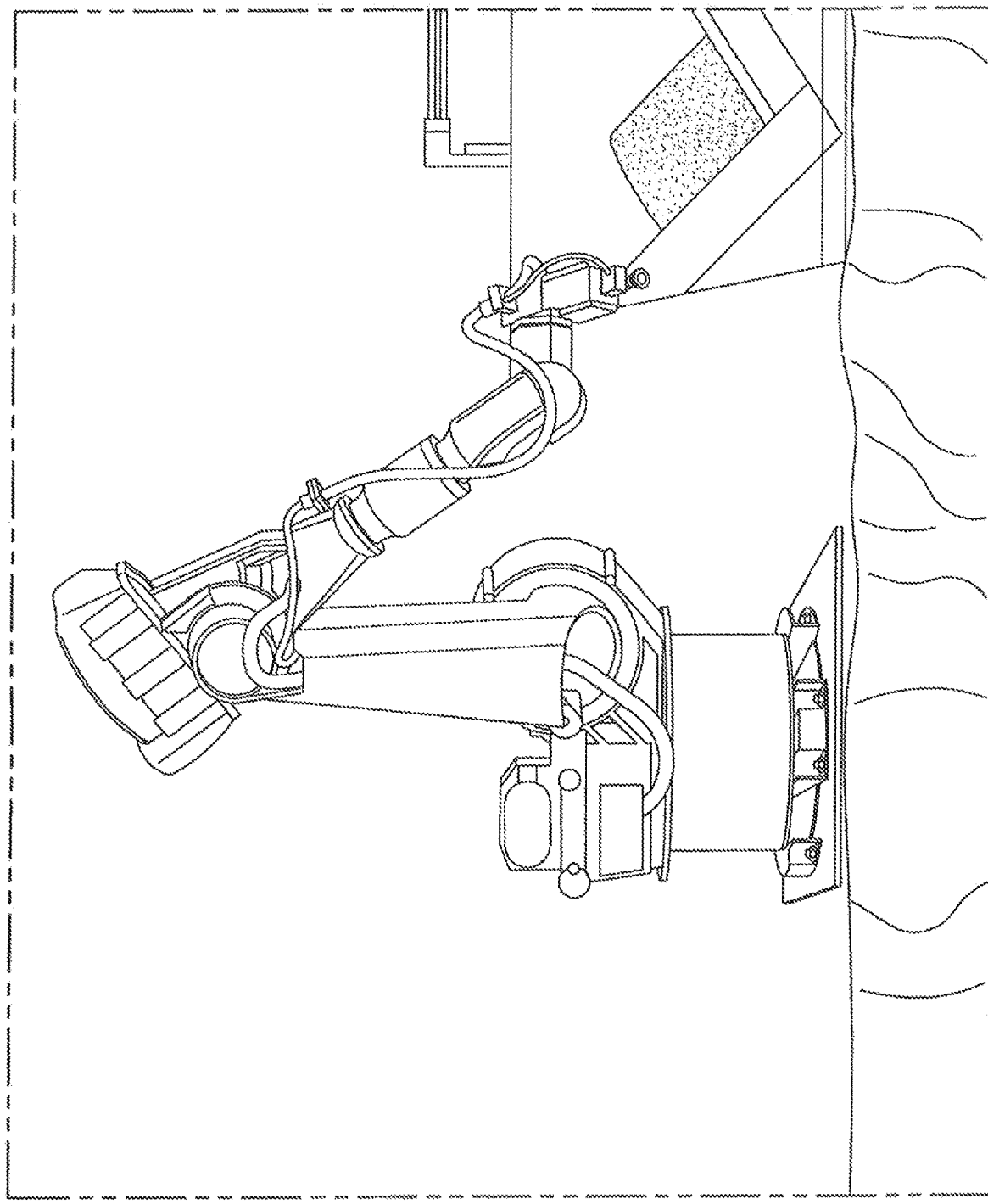
FIG. 13 is a close up view on the robot arm on the right in FIG. 12, showing a succeeding available patch in a V-shaped "pick" presentation hopper. The robot arm will eventually get around to picking that patch for placement on the cover.

FIG. 13 is a close up view on the robot arm on the right in FIG. 12, showing a succeeding available patch in a V-shaped "pick" presentation hopper. The robot arm will eventually get around to picking that patch for placement on the cover.

Figure 14:
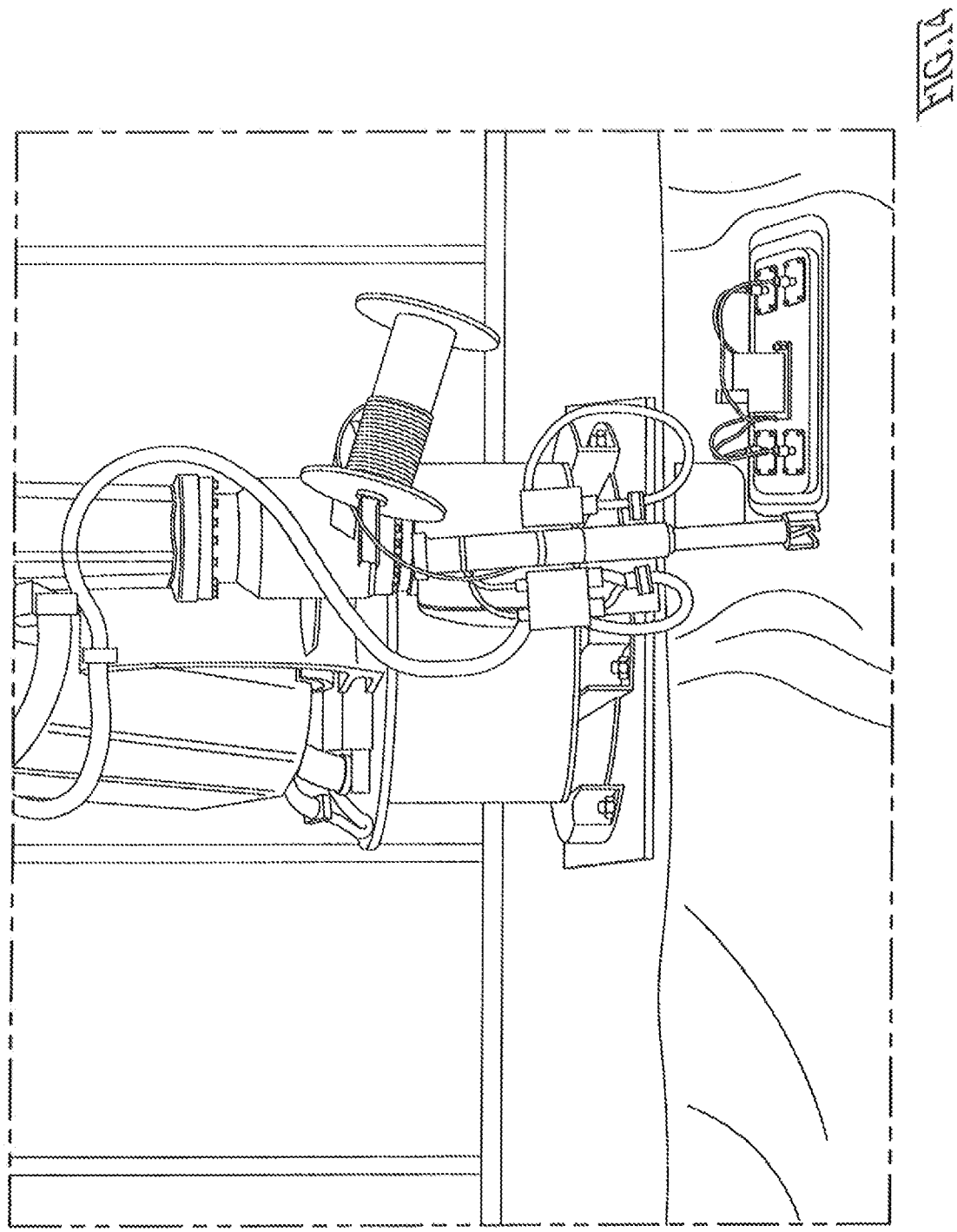
FIG. 14 is a close up view on the robot arm on the left in FIG. 12, showing the welding operation. The coil of black flexible rod above the grapple of the robot arm is HDPE weld rod being fed to the weld tip.
Figure 13:
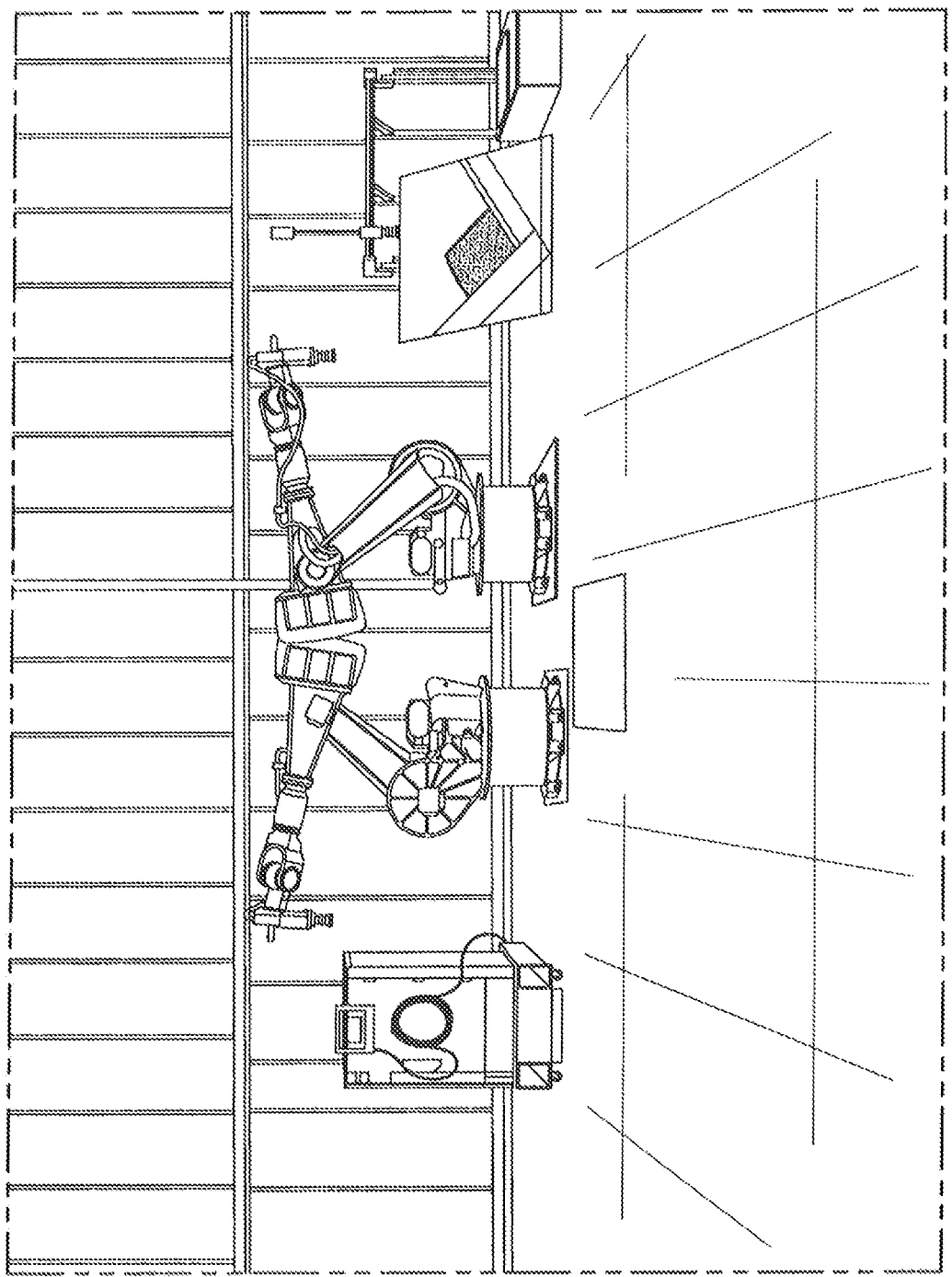

FIG. 14 is a close up view on the robot arm on the left in FIG. 12, showing the welding operation. The coil of black flexible rod above the grapple of the robot arm is HDPE weld rod being fed to the weld tip.

The foregoing serves as an overview introduction to the assembly apparatus and methods in accordance with the invention. FIG. 15 though to the end will serve to provide further details.

FIG. 15 shows the two robot arms in the ready, an available patch in the V-shaped "pick" presentation hopper. The feed stock cover material in these succeeding views will be simulated by a 3 foot square (square meter) test sample of the cover material.

Figure 16:
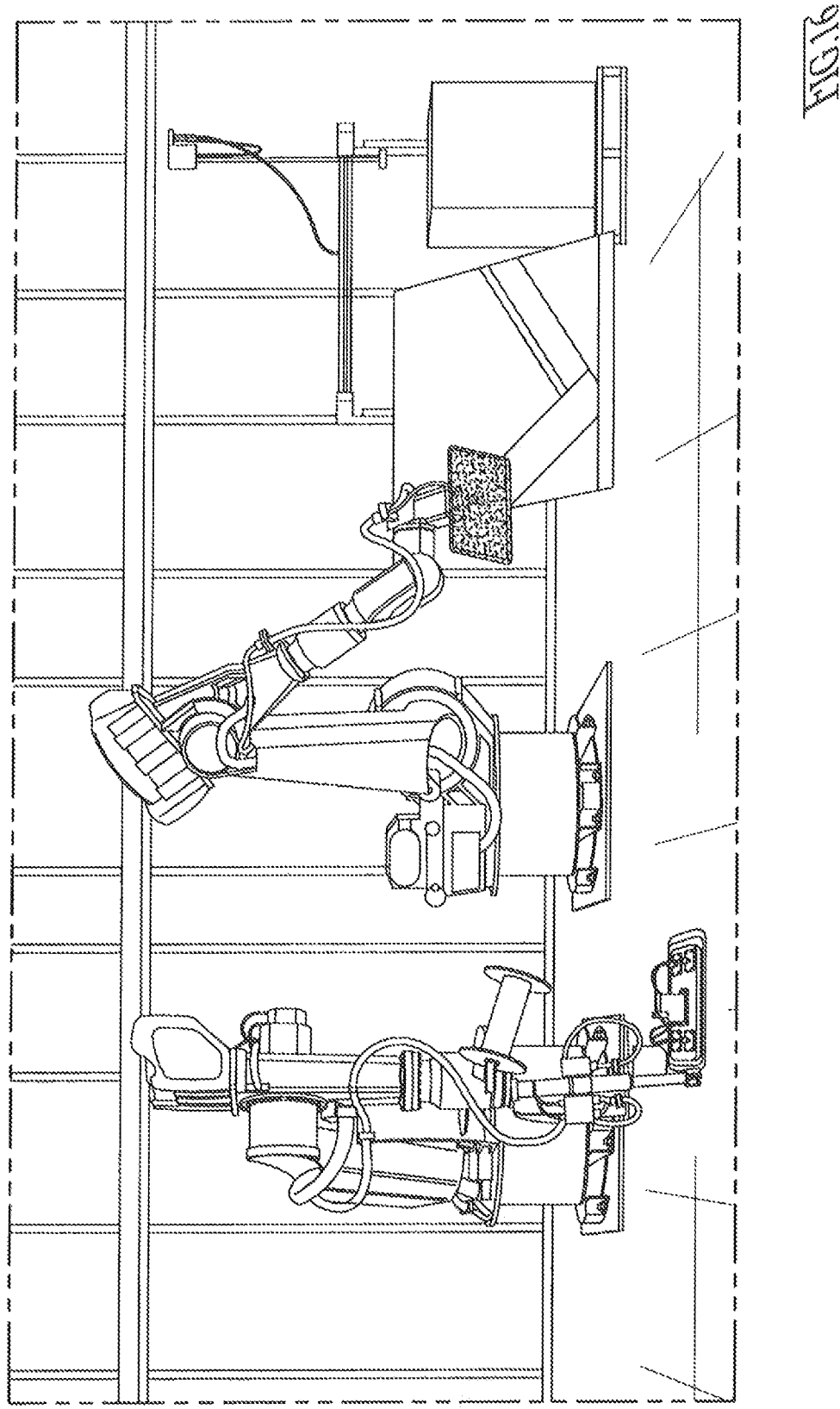
FIG. 16 shows a start operation, if the left robot arm is ignored and attention instead is given to the right of the view. There is an open-topped bin (made of, for no particular reason, plywood) which as a stack of available patches in it which, while not in view here, would simulate what is shown in FIG. 8. An overhead gantry runs linearly between above the bin and above the V-shaped "pick" presentation hopper. The overhead gantry is shown above the bin in this view and it reels up and reels down a pick-up tool which is also a vacuum-operated suction cup. As shown here, one available patch dangles from the vacuum-operated suction cup where it has just been lifted out of the bin.
Figure 10:
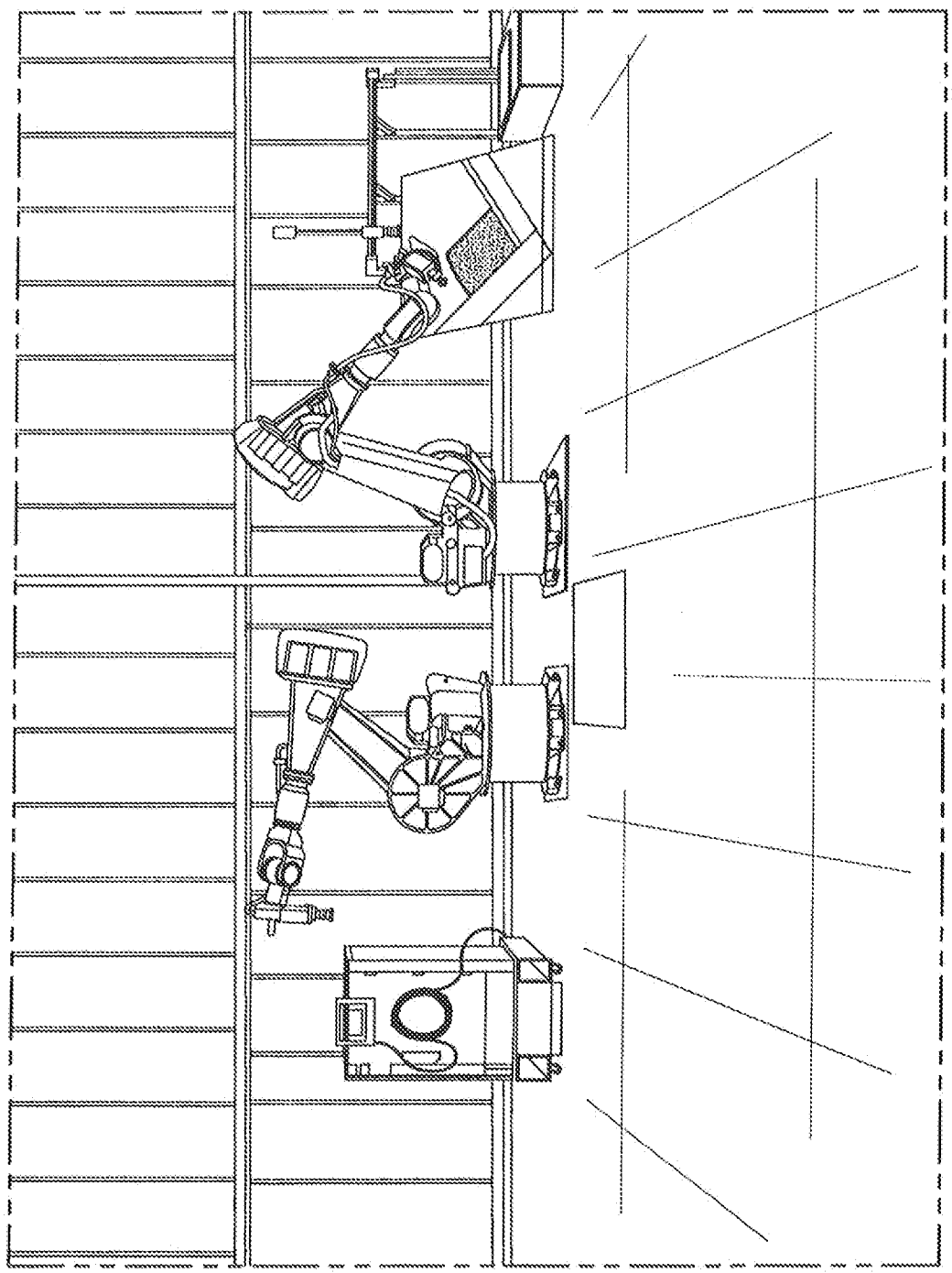

FIG. 16 shows a start operation, if the left robot arm is ignored and attention instead is given to the right of the view. There is an open-topped bin (made of, for no particular reason, plywood) which as a stack of available patches in it which, while not in view here, would simulate what is shown in FIG. 8. An overhead gantry runs linearly between above the bin and above the V-shaped "pick" presentation hopper. The overhead gantry is shown above the bin in this view and it reels up and reels down a pick-up tool which is also a vacuum-operated suction cup. As shown here, one available patch dangles from the vacuum-operated suction cup where it has just been lifted out of the bin.

FIG. 17 is a close up view of the vacuum-operated suction cup lifting the patch out of the bin.

FIG. 18 shows that the vacuum-operated suction cup has dropped the patch onto the V-shaped "pick" presentation hopper. The drop and the V-shaped "pick" presentation hopper are cooperatively designed so that the patch lands in a desired orientation.

FIG. 19 shows the grapple end of the right robot arm manipulating the metal suction plate/block to "pick" the patch. Note that the meter square cover sample is bare, the one shown in FIGS. 16 and 18 having been removed and replaced by a bare sample.

FIG. 20 shows that the patch has indeed been "picked" by the right robot arm, by and through the metal suction plate/block.

Figure 21:
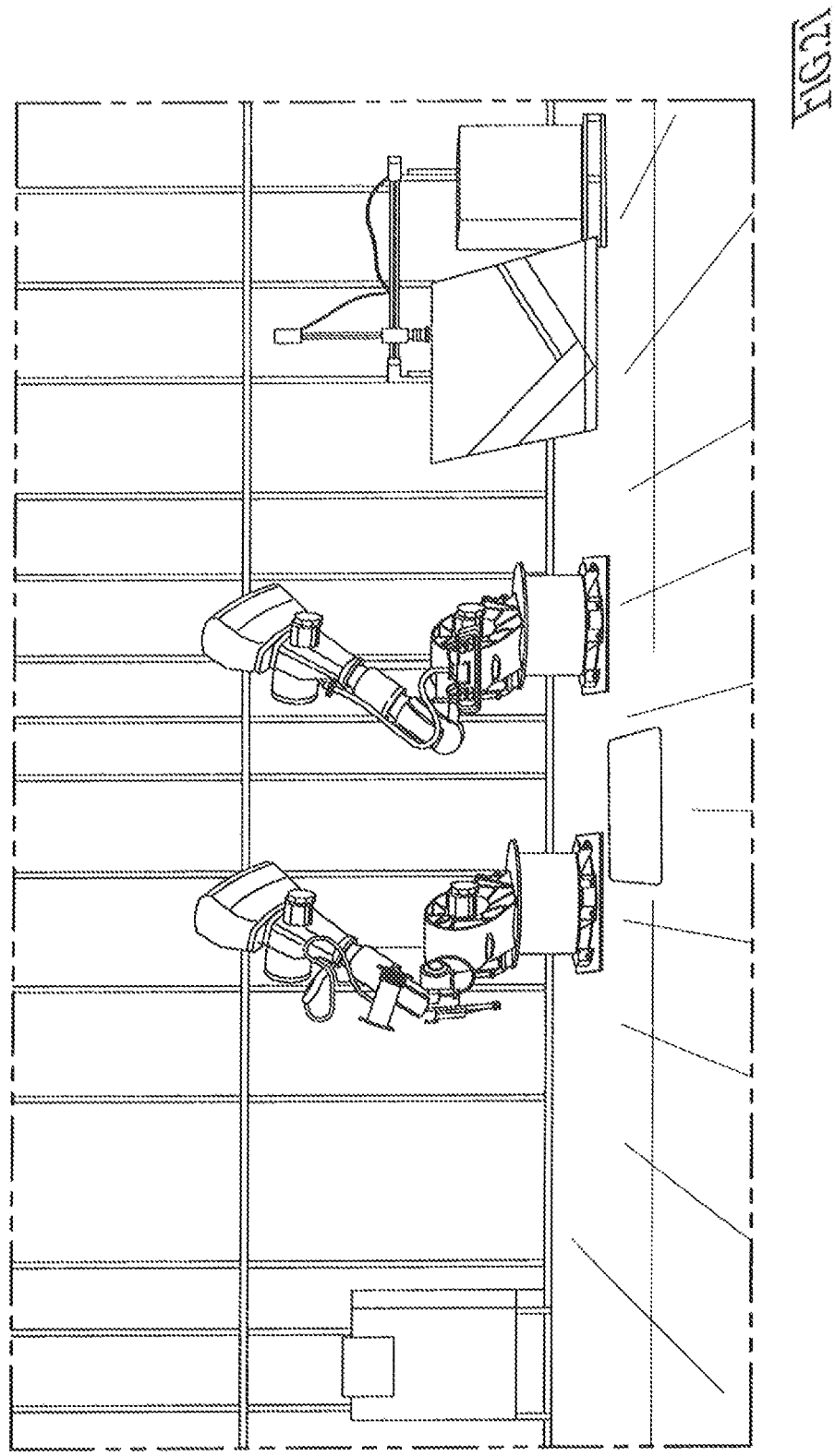
FIG. 21 shows the right robot arm in the process of "placing" the patch in the target location.

FIG. 21 shows the right robot arm in the process of "placing" the patch in the target location.

Figure 22:
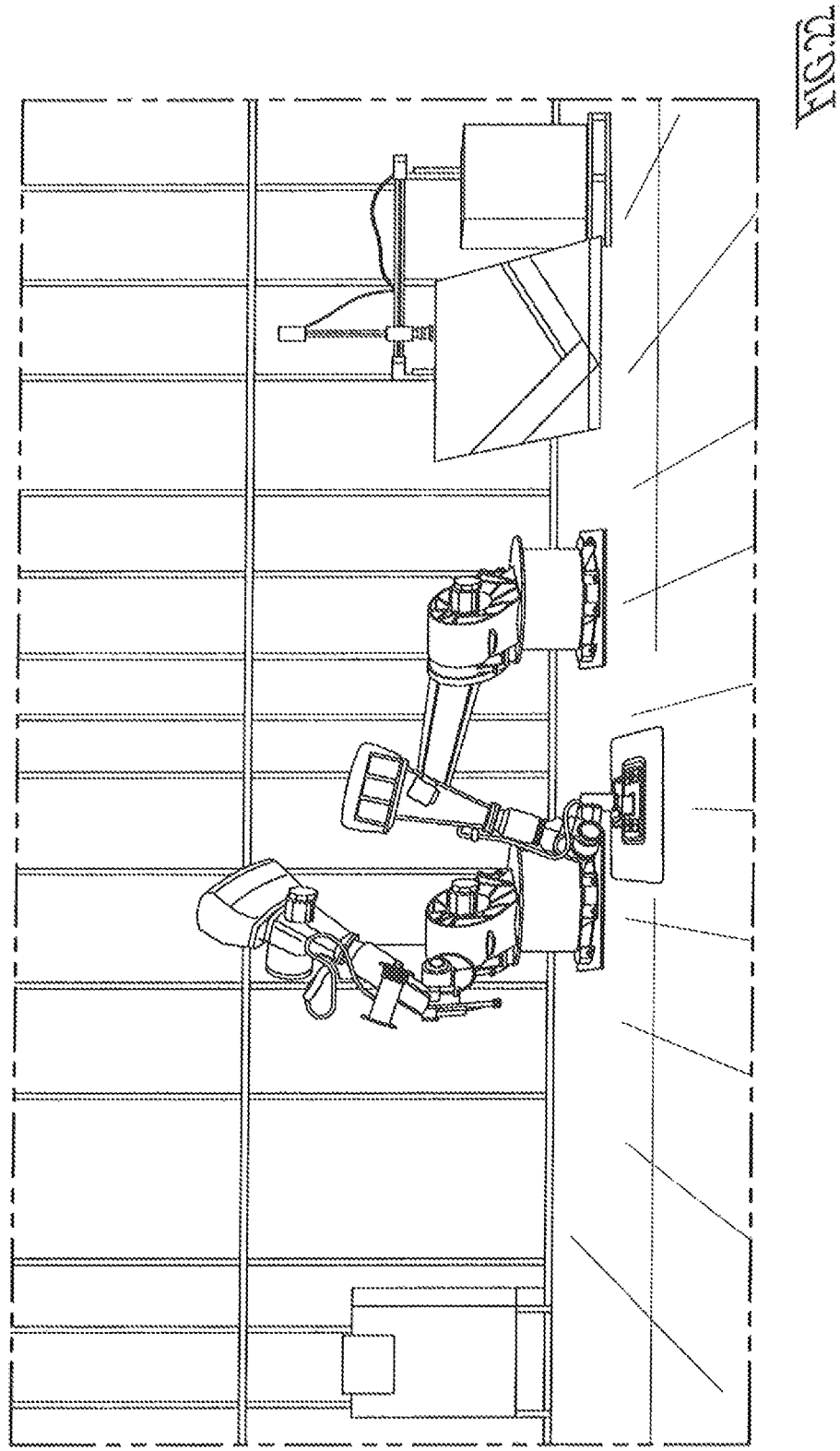
FIG. 22 shows placement, that the patch has been successfully landed on the target location.

FIG. 22 shows placement, that the patch has been successfully landed on the target location.

Figure 23:
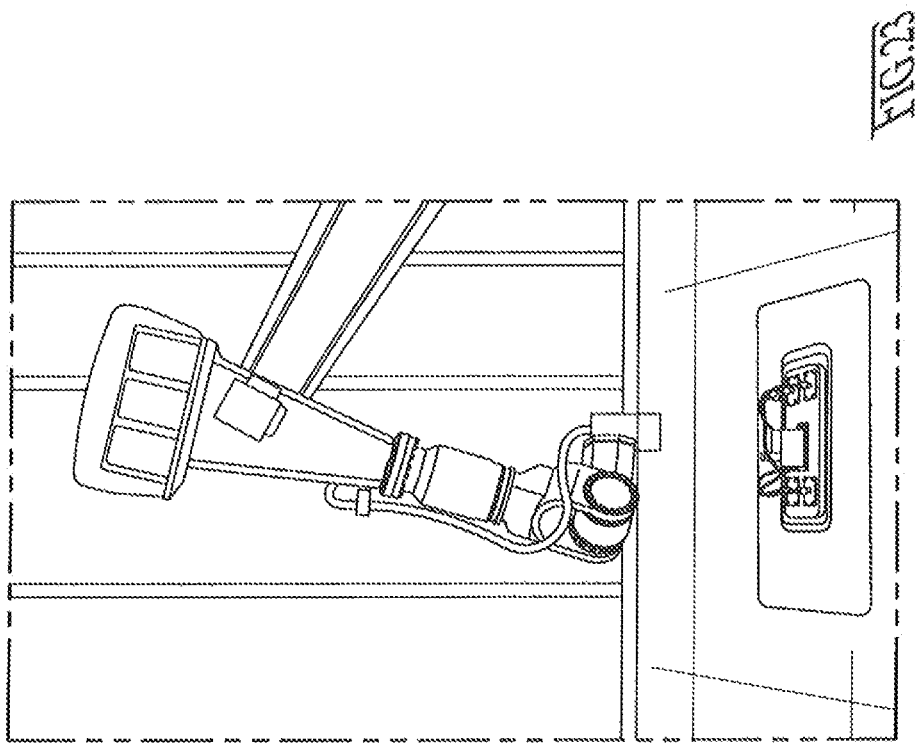
FIG. 23 shows that the right robot arm has de-coupled from the metal suction plate/block and is moving away from the metal suction plate/block. Both the metal suction plate/block and patch are left behind in the selected placement on the sample cover material.

FIG. 23 shows that the right robot arm has de-coupled from the metal suction plate/block and is moving away from the metal suction plate/block. Both the metal suction plate/block and patch are left behind in the selected placement on the sample cover material.

FIG. 24 shows the grapple end of the robot arm doing a 180° rotation (i.e., inversion). The grapple end is going to present an abrading tool in the downward position at the end of this rotation.

Figure 25:
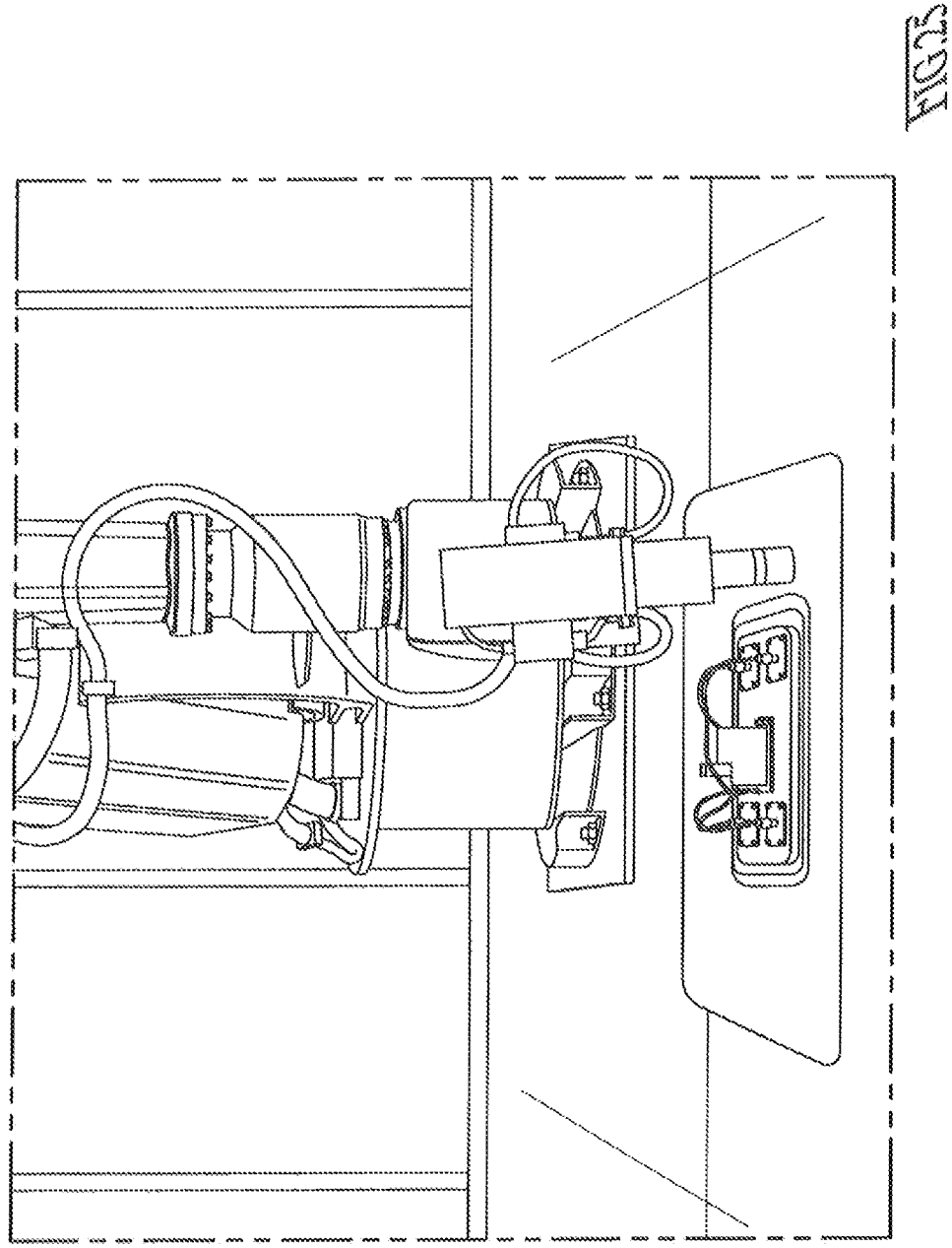
FIG. 25 shows the right robot arm both supplying motive power to the rotating abrading tool and the coursing of the tool 360° around the periphery of the patch and its border with the cover material, thereby "scarifying" (or abrading, scraping or sanding and so on) a skin layer off both the patch and cover material where the weld seam will be formed.

FIG. 25 shows the right robot arm both supplying motive power to the rotating abrading tool and the coursing of the tool 360° around the periphery of the patch and its border with the cover material, thereby "scarifying" (or abrading, scraping or sanding and so on) a skin layer off both the patch and cover material where the weld seam will be formed.

Figure 26:
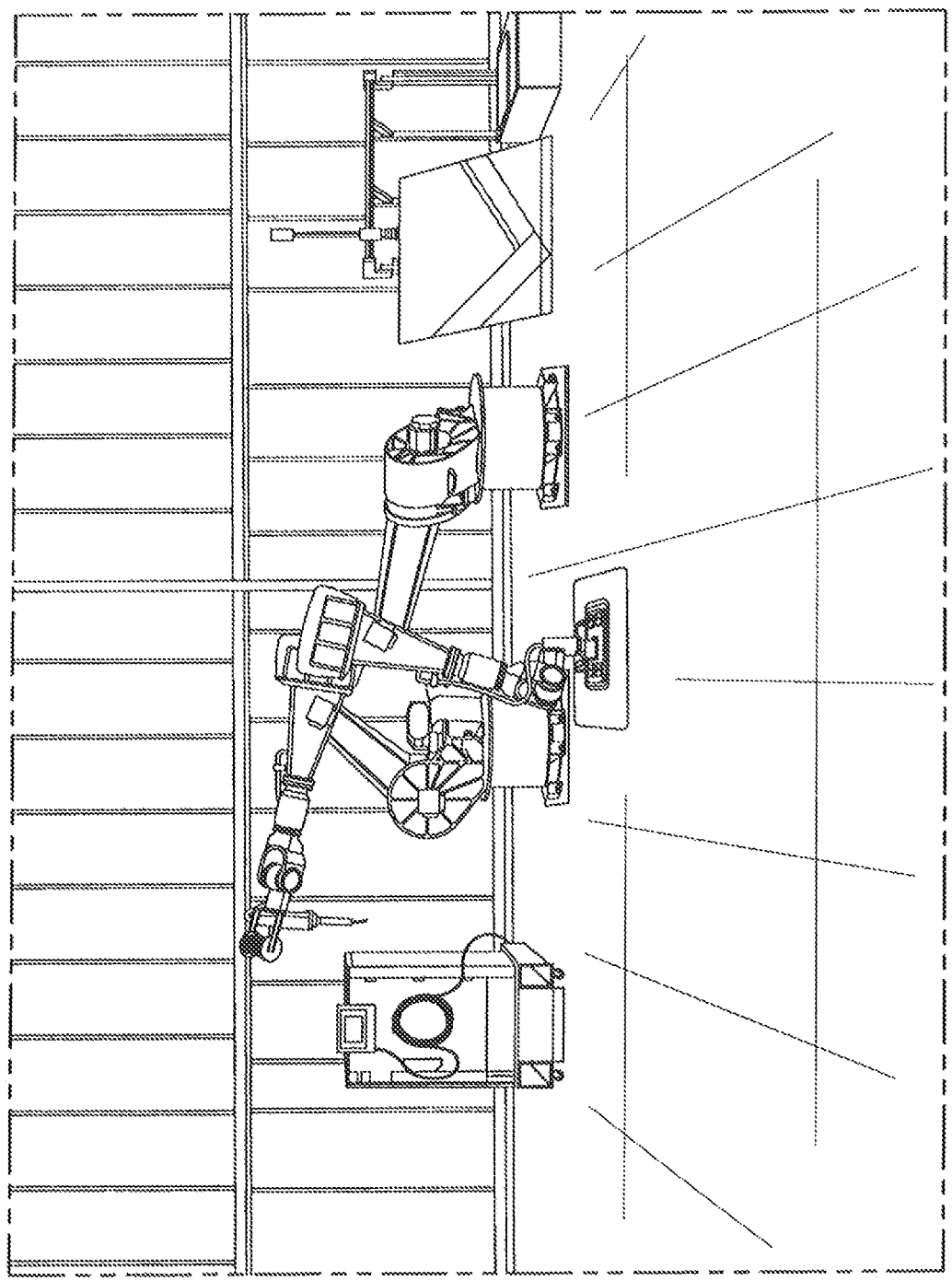
FIG. 26 shows continuation of the scarifying process with the right robot arm. In the meantime, the left robot arm is preparing for welding by undergoing a "bleeding" operation with the weld rod. Essentially, welding is performed in part by extrusion of molten weld rod out of a nozzle tip end and in other part with jets of hot air (or hot gas), and as shown here, molten weld rod is being extruded out the nozzle tip end and being allowed to dump into a 5 gallon bucket. In other words, the nozzle tip end is being brought up to temperature.

FIG. 26 shows continuation of the scarifying process with the right robot arm. In the meantime, the left robot arm is preparing for welding by undergoing a "bleeding" operation with the weld rod. Essentially, welding is performed in part by extrusion of molten weld rod out of a nozzle tip end and in other part with jets of hot air (or hot gas), and as shown here, molten weld rod is being extruded out the nozzle tip end and being allowed to dump into a 5 gallon bucket. In other words, the nozzle tip end is being brought up to temperature.

Figure 27:
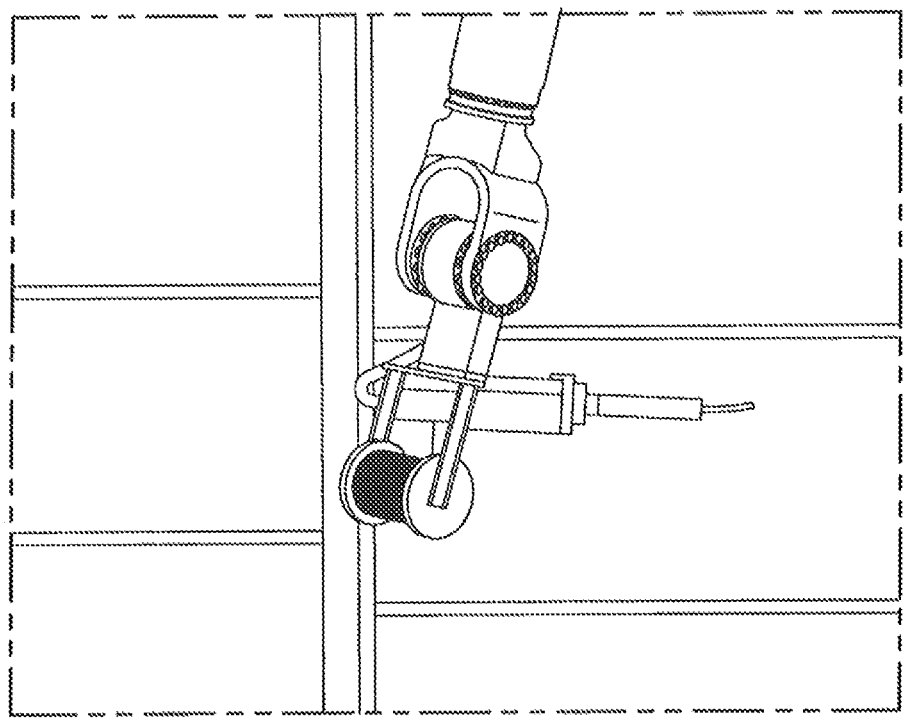
FIG. 27 is a close up view of the bleeding of weld rod out of the nozzle tip end.

FIG. 27 is a close up view of the bleeding of weld rod out of the nozzle tip end.

Figure 28:
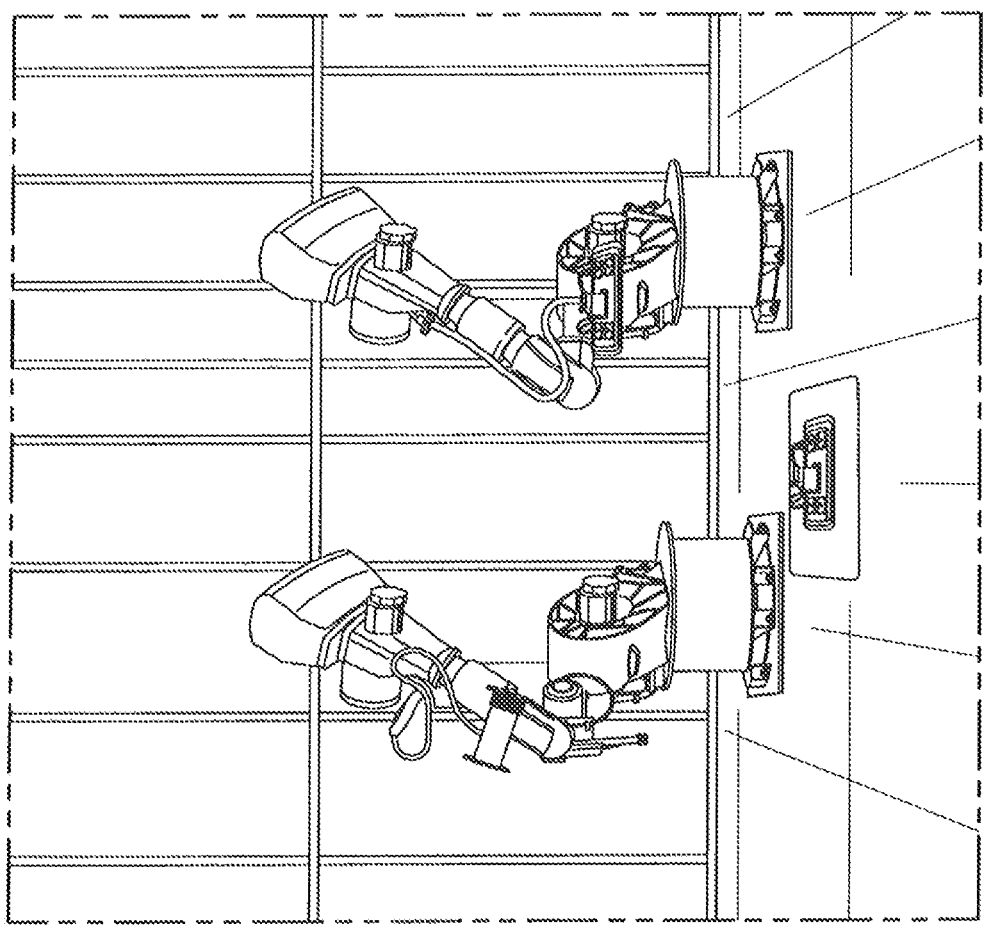
FIG. 28 shows the left robot arm in motion and manipulating its grapple end for aiming the weld-nozzle tip end for welding the seam between the patch and cover sample.

FIG. 28 shows the left robot arm in motion and manipulating its grapple end for aiming the weld-nozzle tip end for welding the seam between the patch and cover sample.

Figure 29:
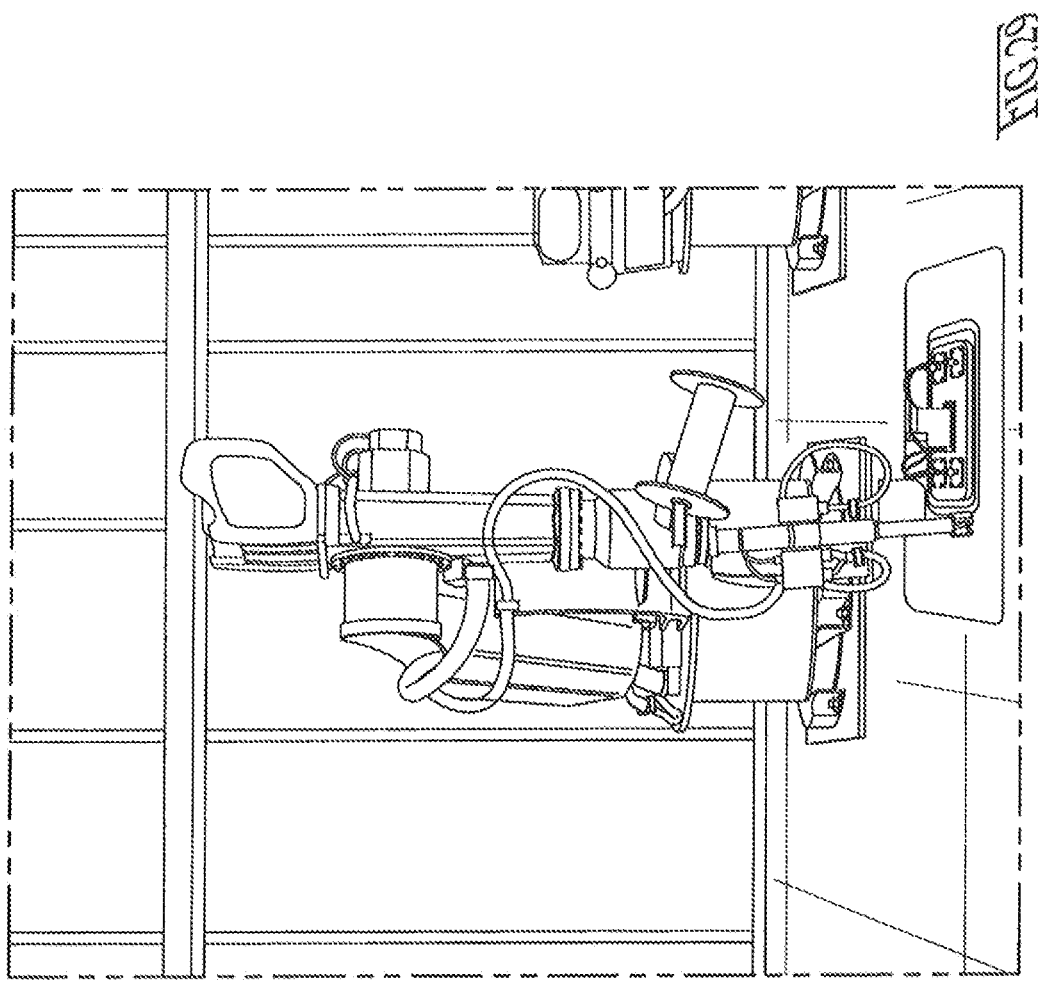
FIG. 29 shows welding in process.

FIG. 29 shows welding in process.

Figure 30:
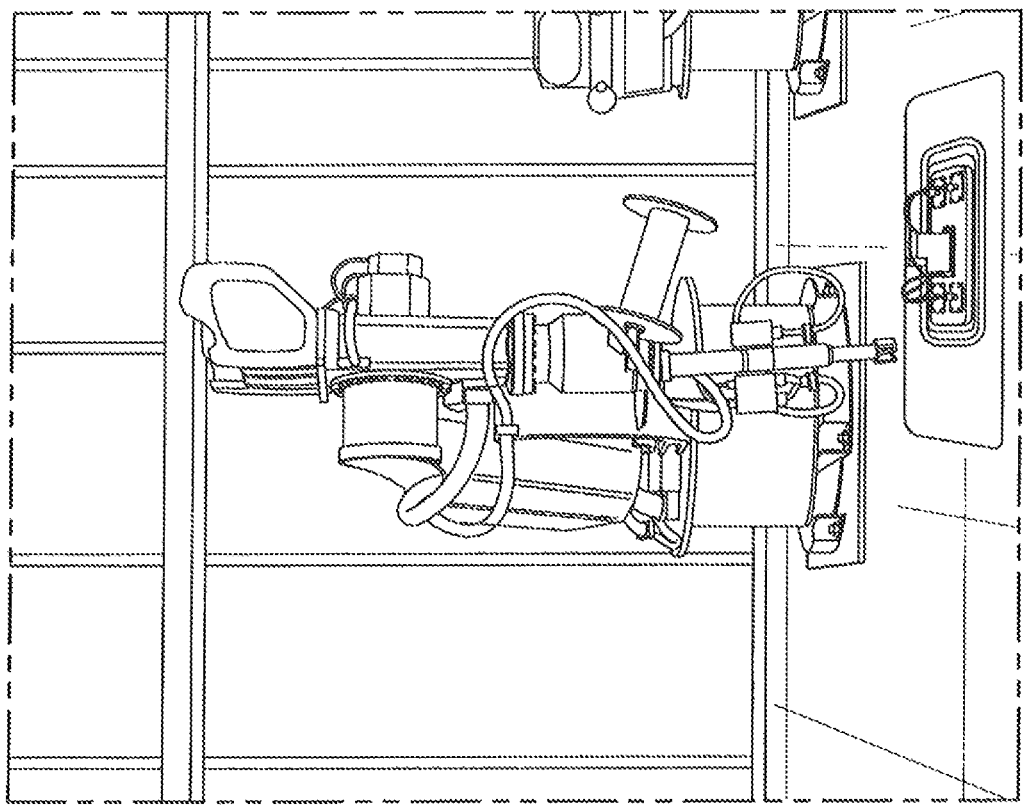
FIG. 30 shows welding is complete, and left robot arm is moving its grapple end out of the way. The welding operation leaves behind a 360° endless weld seam joining the patch to the liner.

FIG. 30 shows welding is complete, and left robot arm is moving its grapple end out of the way. The welding operation leaves behind a 360° endless weld seam joining the patch to the liner.

Figure 31:
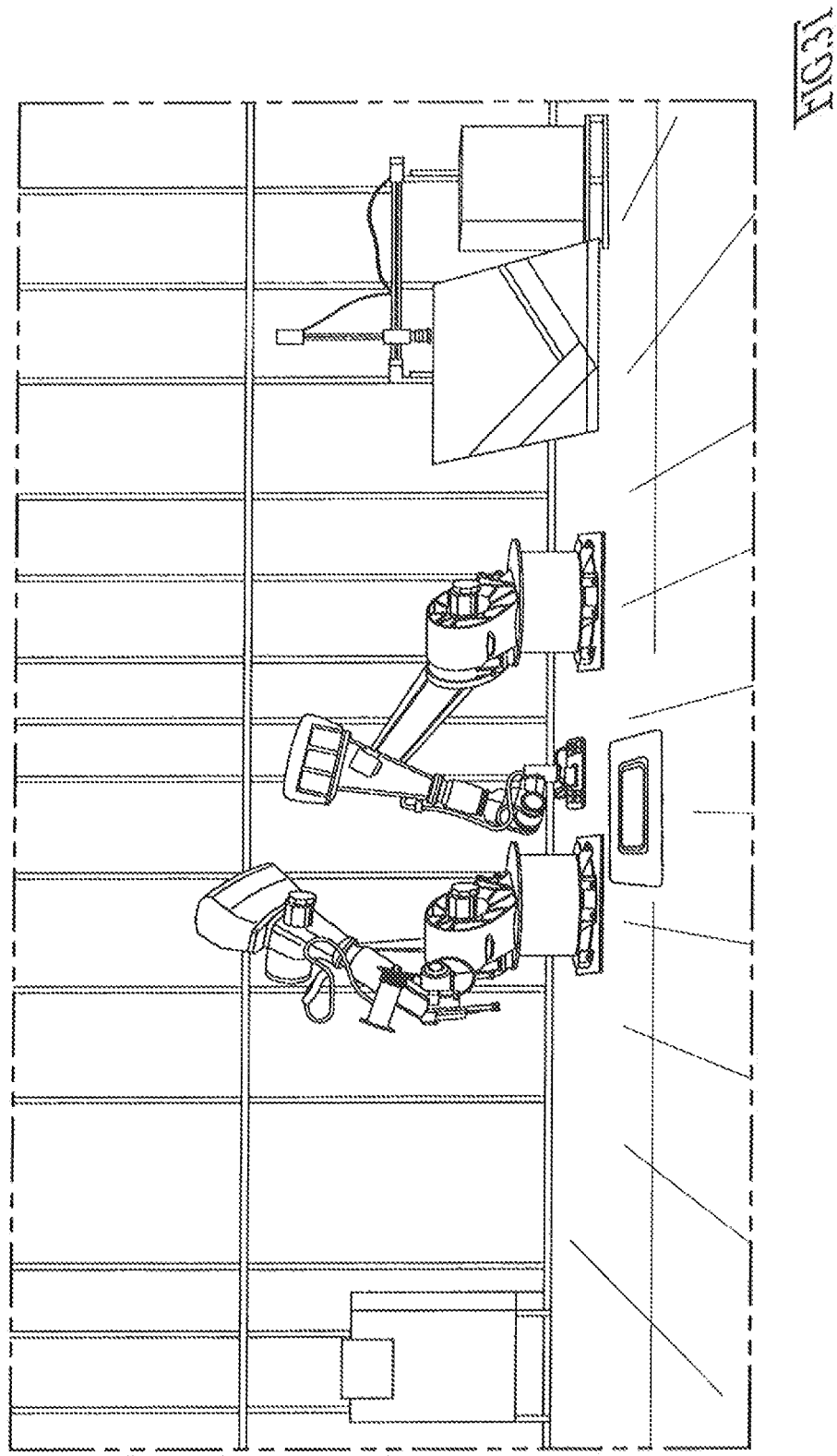
FIG. 31 shows that the right robot arm has returned to action and has picked up the metal suction plate/block off the patch. The patch is left behind, permanently welded to the cover.

FIG. 31 shows that the right robot arm has returned to action and has picked up the metal suction plate/block off the patch. The patch is left behind, permanently welded to the cover.

FIG. 32 simulates what is preferred to happen. That is, preferably an outstretched span of cover material as shown in FIG. 10, 12 or 14 would be ready for either attachment of a successive patch in a row extending away from the robot arms and into the vantage point of the view, or else, the span would be incrementally conveyed the linear length of distance between rows and a new row of patches would be assembled. In any event, following FIG. 31, where the last patch to be freshly attached is complete, the apparatus and method moves on toward attaching a succeeding patch in the series of the multiplicity of patches. So here in FIG. 32, what is shown instead is a fresh bare meter square sample of cover material. The right robot arm has already "picked" the next patch for "placement," and is in action to place the patch.

Figure 33:
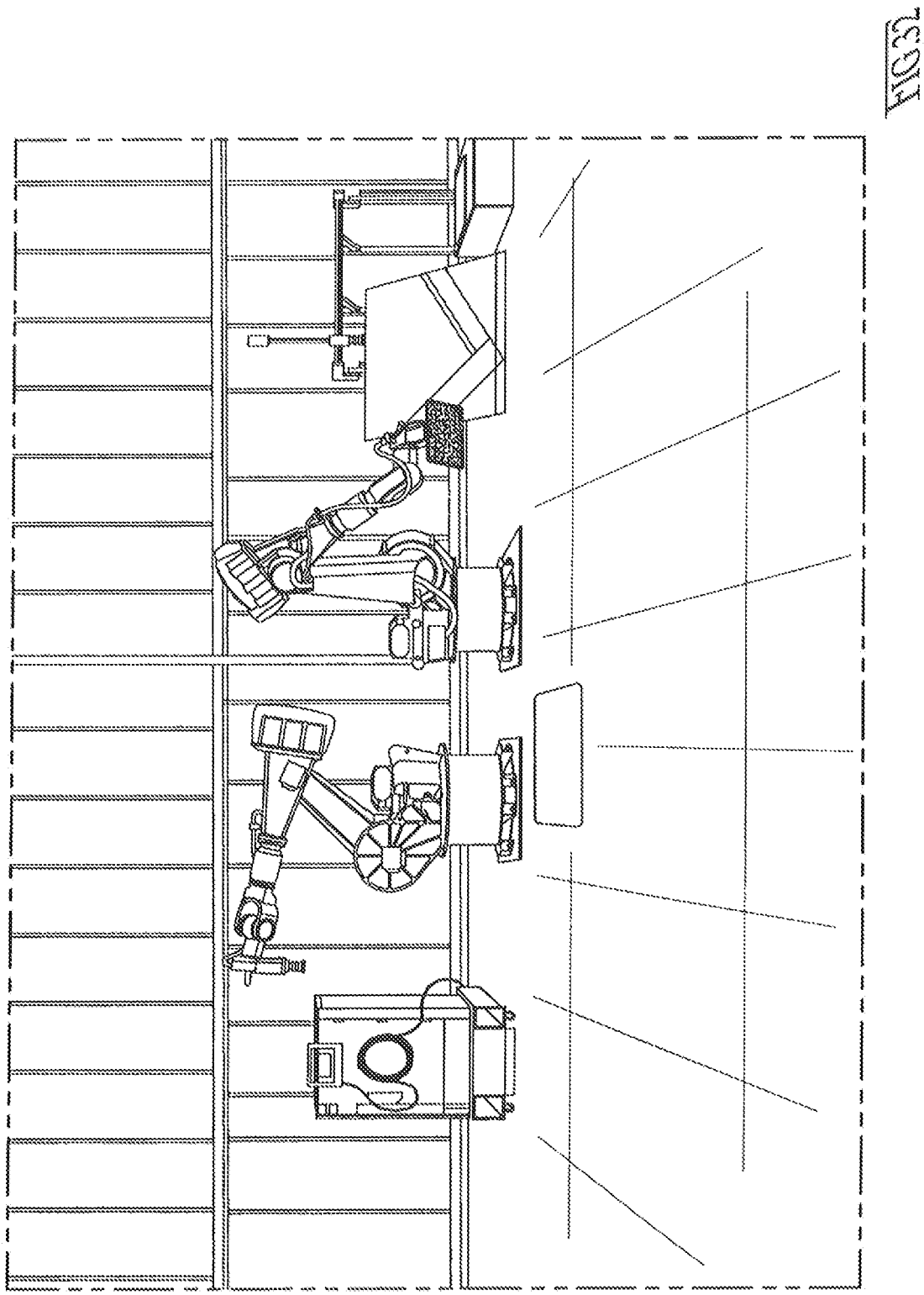
FIG. 33 would preferably show, but instead simulates, a completed cover, populated with its full population of distributed patches.
Figure 33:
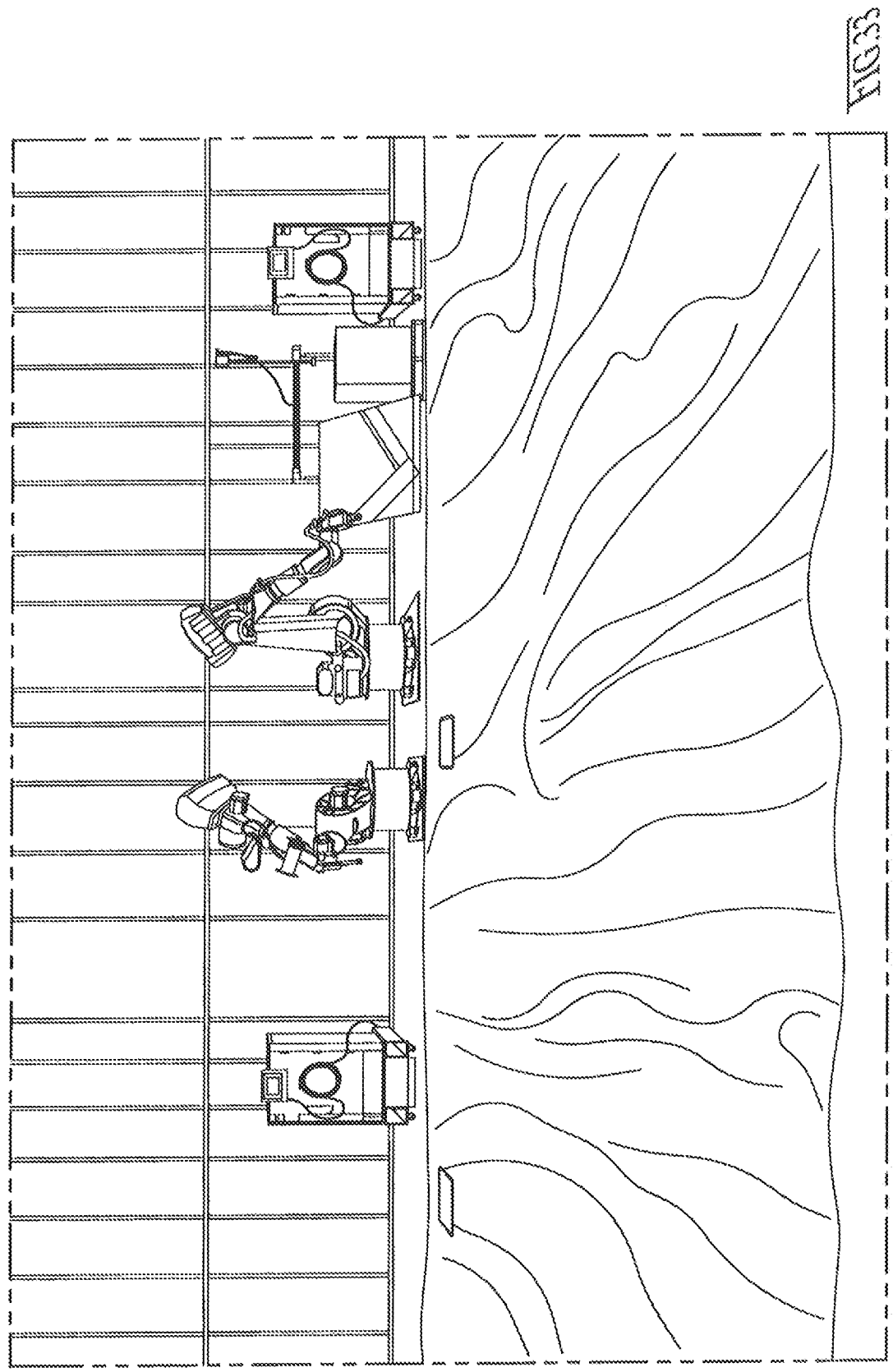

FIG. 33 would preferably show, but instead simulates, a completed cover, populated with its full population of distributed patches.

Figure 34:
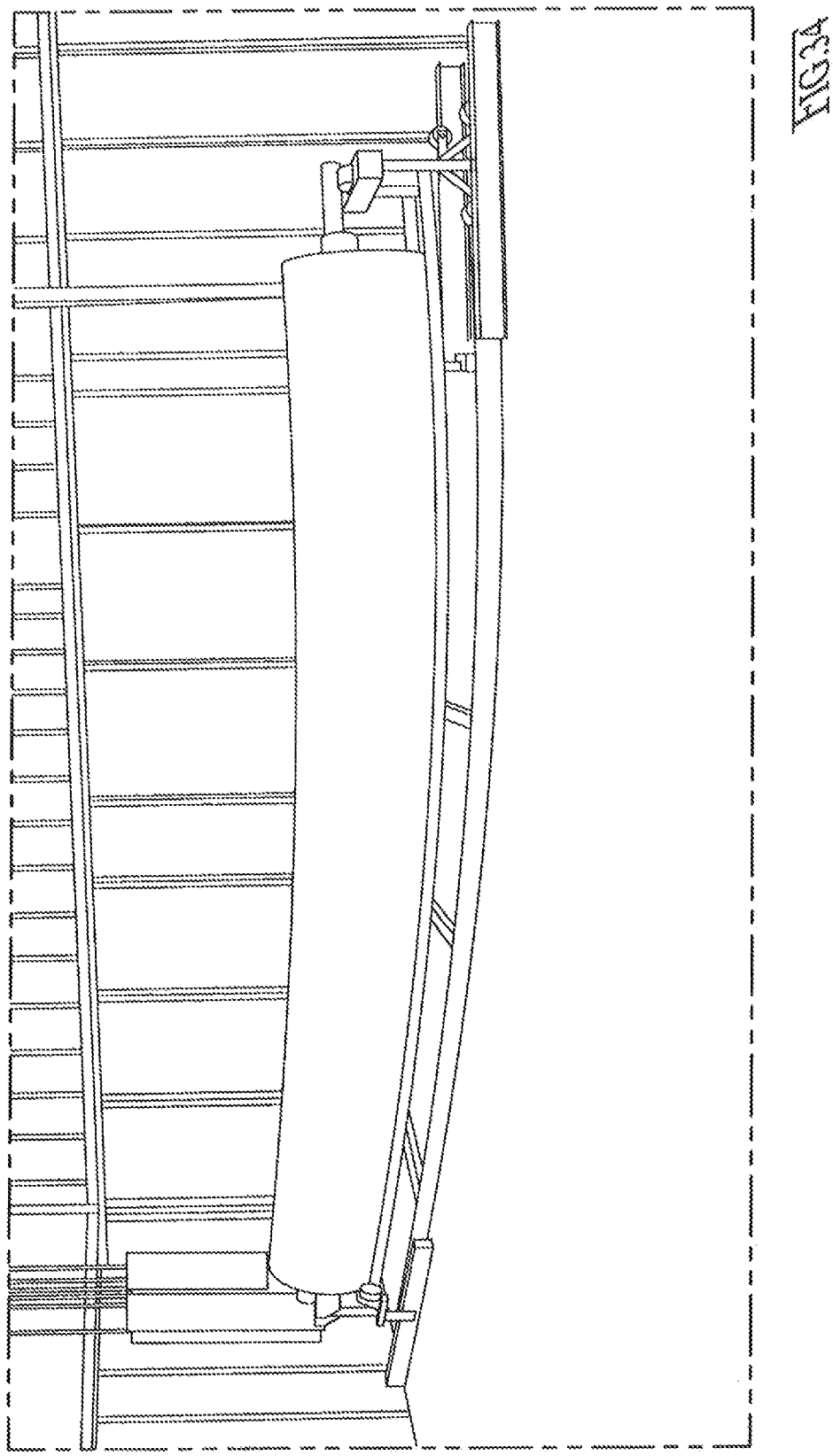
FIG. 34 shows the completed wind-up roll, which will likely be stored for a temporary period until a whole job-site contingent of such wind-up rolls can be completed.

FIG. 34 shows the completed wind-up roll, which will likely be stored for a temporary period until a whole job-site contingent of such wind-up rolls can be completed.

FIG. 35 is a color image of a second embodiment in accordance with the invention for pre-attaching a distributed array of patches on a roll of sheet-form HDPE material. The second embodiment comprises a gantry, a bed of sheet-form HDPE spread out underneath the gantry, and a traveling head that travels out and back on the gantry across and above the spread out sheet-form HDPE.

The sheet-form HDPE scrolls either left or right, but whichever way, it is preferred to scroll in that one direction only. The scrolling of the sheet-form HDPE establishes a relative X-axis for X-Y mapping of the placement of the patches on the sheet-form HDPE. That is, the gantry is preferably stationary. And thus again, the scrolling of the sheet-form HDPE establishes a relative X-axis for X-Y mapping of the placement of the patches on the sheet-form HDPE, but not by an X-axis travel of the gantry. The out and back trips of the traveling head establishes the relative Y-axis.

FIG. 36 is a color image comparable to FIG. 35 except on an enlarged scale and showing better the mounting of the traveling head on the tracks provided by the gantry.

FIG. 37 is a color image comparable to FIG. 36 except on an enlarged scale and showing better still the mounting of the traveling head on the tracks provided by the gantry.

The traveling head carries a motor to carry propel itself for its out and back trips, as well as to power a robotic arm which serves many functions including (1) pick, (2) place and (3) weld (or attach). That is, the robotic arm picks a patch from source stack of available packs, which stacks are carried by the traveling head. The robotic arm places the patch in a pre-programmed (or instruction signal sent) placement on the spread out sheet-form HDPE. Then the robotic arm attaches the patch in place by chemical and/or thermal welding.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

What is claimed is:

1. A method of attaching high density polyethylene (HDPE) patches at distributed locations on expansive sheet-form HDPE covers for wastewater treatment lagoons, which HDPE patches provide locally increased thickness to the HDPE cover in service as seats for attachment of further attachments to the HDPE cover; said method comprising the steps of:

providing a planar workspace;

bracketing the workspace with one elongated roller and a spaced other elongated roller;

supplying an indefinitely expansive span of sheet-form HDPE in a roll on the one roller;

taking up the sheet-form HDPE on the other roller whereby the sheet-form roll progressively translates across the workspace;

providing a gantry generally parallel with the one and the other roller and intermediate thereof;

propelling a traveling head along out and back trips on the gantry above the sheet-form HDPE below whereby the scrolling of the sheet-form HDPE establishes a relative X-axis for X-Y mapping of the placement of patches on the sheet-form HDPE while correspondingly the out and back trips of the traveling head establishes the relative Y-axis; and provisioning the traveling head to carry a motor to carry propel the traveling head for the out and back trips thereof, as well as to power a robotic arm which provides services including (1) pick, (2) place and (3) weld (or attach);

wherein the robotic arm picks a patch from source stack of available packs, which stacks are carried by the traveling head, the robotic arm places the patch in a pre-programmed (or instruction signal sent) placement on the spread out sheet-form HDPE, and, robotic arm attaches the patch in place by chemical and/or thermal welding.

2. The method of claim 1, wherein:

the planar workspace comprises a factory floor.

\* \* \* \* \*